(12) United States Patent
Milman et al.

(10) Patent No.: US 7,957,979 B2
(45) Date of Patent: *Jun. 7, 2011

(54) METHOD AND SYSTEM FOR PROVIDING REAL ESTATE INFORMATION USING A COMPUTER NETWORK, SUCH AS THE INTERNET

(75) Inventors: Robert N. Milman, Winston-Salem, NC (US); Pete Andrews, Winston-Salem, NC (US); Joan Milman, Winston-Salem, NC (US)

(73) Assignee: Home Mart, Inc., Winston-Salem, NC (US)

( * ) Notice: Subject to any disclaimer, the term of this patent is extended or adjusted under 35 U.S.C. 154(b) by 237 days.

This patent is subject to a terminal disclaimer.

(21) Appl. No.: 12/256,072

(22) Filed: Oct. 22, 2008

(65) Prior Publication Data

US 2009/0150216 A1    Jun. 11, 2009

Related U.S. Application Data

(63) Continuation of application No. 09/724,268, filed on Nov. 28, 2000, now Pat. No. 7,454,355.

(60) Provisional application No. 60/200,169, filed on Apr. 27, 2000.

(51) Int. Cl.
*G06Q 10/00* (2006.01)
(52) U.S. Cl. ........................................................ 705/1.1
(58) Field of Classification Search ................... 705/1.1
See application file for complete search history.

(56) References Cited

U.S. PATENT DOCUMENTS

| 5,032,989 A | 7/1991 | Tometta |
| 5,325,297 A | 6/1994 | Bird et al. |
| 5,584,025 A | 12/1996 | Keithley et al. |
| 5,664,115 A | 9/1997 | Fraser |
| 5,754,850 A | 5/1998 | Janssen |

(Continued)

OTHER PUBLICATIONS

Information on Realtor Workstation, 1996-2000.*

(Continued)

*Primary Examiner* — Naresh Vig
(74) *Attorney, Agent, or Firm* — Finnegan, Henderson, Farabow, Garret & Dunner LLP

(57) ABSTRACT

The present invention provides methods and systems for providing real-estate information using a computer network, such as the Internet. A buyer information web page showing relevant buyer list information in an easy-to-read, summary format is created and displayed to a real estate agent. Buyer information provided includes summaries of various aspects of information needed by a real estate agent to effectively represent and assist a buyer. Examples of information provided include a potential buyer name, a new activity summary summarizing newly-listed properties and other activity meeting the buyer's profile, a new views summary summarizing any views of detailed property information by the buyer using an online property data search and information system provided by the agent, and a new tags summary summarizing any properties that the buyer or the agent finds of particular interest. Moreover, a comparative market analysis (CMA) list web page showing relevant CMA information in an easy-to-read, summary format is also created and displayed to the real estate agent.

52 Claims, 30 Drawing Sheets

U.S. PATENT DOCUMENTS

| | | | |
|---|---|---|---|
| 5,781,773 | A | 7/1998 | Vanderpool et al. |
| 6,122,648 | A | 9/2000 | Roderick |
| 6,363,391 | B1 | 3/2002 | Rosensteel, Jr. |
| 6,446,119 | B1 | 9/2002 | Olah et al. |
| 6,594,633 | B1 | 7/2003 | Broerman et al. |
| 6,684,196 | B1 | 1/2004 | Mini et al. |
| 2001/0039496 | A1 | 11/2001 | Good et al. |
| 2002/0004907 | A1 | 1/2002 | Donahue |

OTHER PUBLICATIONS

Information on HomesDatabase.com, 1999-2000.*

Judith N Motti. Customer Tracking: It's Not Just Web-site hits, Feb. 7, 2000. Information Week, Issue 772, p. 104.*

Judith N. Motti, Customer Tracking: It's Not Just Web-site hits, Feb. 7, 2000, Information Week, Issue 772, p. 104.*

* cited by examiner

FIG. 2A

| Frontpage | Buyer Services | CMA Services | Quick Search | Message Box | To Do List | Profile |

Listingbook services

□ Buyer List → Jennifer Gray → Home Finder Results

254 Properties in 9 pages     One line | Thumbnail

Click on the address to view property details     Order [Update Date ▽]

☺ Perfect Match
[A]ctive [P]ending Sale [S]old

| | Address | Sub-Division | Lvls | BdRm | Bath | Age | Sq Ft | Price | DOM | Tag 72 |
|---|---|---|---|---|---|---|---|---|---|---|
| A | 6638 Flat Creek Dr. | Polo View | 1.5 | 4 | 2.1 | 6 | 2465 | $180,900 | 25 | ☐ |
| A | 11708 Kilpatrick Ln. | Wilderness Pond | 2.0 | 4 | 2.1 | 2 | 1957 | $170,500 | 25 | ☐ |
| A | 10731 Fairway Ridge Rd. | Williamsburg South | 2.0 | 3 | 2.1 | 15 | 2370 | $212,000 | 62 | ☐ |
| A | 11207 Fox Mill Ln. | Provincetowne | 2.0 | 3 | 2.1 | 13 | 1820 | $134,900 | 84 | ☐ |
| A | 6614 Red Maple Dr. | Orchid Hill | 2.0 | 4 | 2.1 | 5 | 3434 | $274,900 | 32 | ☐ |
| A | 12300 Old Prairie Rd. | South Point | 1.0 | 3 | 2.0 | 8 | 1300 | $129,900 | 123 | ☐ |
| A | 10825 Megwood Dr. | Bend Ck | 2.0 | 4 | 3.1 | 5 | 3053 | $299,950 | 119 | ☐ |
| A | 8734 Red Maple Dr. | Orchid Hill | 2.0 | 3 | 2.1 | 2 | 2096 | $214,900 | 300 | ☐ |
| A | 10417 Pullen Green Dr. | Pullengreen | 1.5 | 4 | 2.1 | 8 | 2700 | $284,900 | 28 | [ |

| Column Name | Type | Length | |
|---|---|---|---|
| pw | varchar | 10 | <-- Buyer's Password |
| in_ts | datetime | 8 | <-- When Buyer Was Added To System |
| login_ts | datetime | 8 | <-- Date/Time of Buyer's Last Login |
| name | varchar | 40 | <-- Buyer's Last Name |
| email | varchar | 100 | <-- Buyer's E-mail address |
| first_name | varchar | 25 | <-- Buyer's First Name |
| uid | varchar | 10 | <-- Buyer's User ID |
| adr1 | varchar | 30 | <-- Buyer's Address Line 1 |
| adr2 | varchar | 30 | <-- Buyer's Address Line 2 |
| city | varchar | 20 | <-- Buyer's City |
| state | varchar | 15 | <-- Buyer's State |
| zip | varchar | 9 | <-- Buyer's Zip Code |
| wk1 | varchar | 3 | <-- Buyer's Work Phone Area Code |
| wk2 | varchar | 3 | <-- Buyer's Work Phone 1st 3 Digits |
| wk3 | varchar | 4 | <-- Buyer's Work Phone last 4 Digits |
| hm1 | varchar | 3 | <-- Buyer's Home Phone Area Code |
| hm2 | varchar | 3 | <-- Buyer's Home Phone 1st 3 Digits |
| hm3 | varchar | 4 | <-- Buyer's Home Phone last 4 Digits |
| pager1 | varchar | 3 | <-- Buyer's Pager Area Code |
| pager2 | varchar | 3 | <-- Buyer's Pager 1st 3 Digits |
| pager3 | varchar | 4 | <-- Buyer's Pager last 4 Digits |
| fax1 | varchar | 3 | <-- Buyer's Fax Area Code |
| fax2 | varchar | 3 | <-- Buyer's Fax 1st 3 Digits |
| fax3 | varchar | 4 | <-- Buyer's Fax last 4 Digits |
| status | varchar | 1 | <-- Buyer's Status (Client or Customer) |
| grant_report | varchar | 1 | <-- Agent Set Buyer Access to report feature |
| grant_search | varchar | 1 | <-- Agent Set Buyer Access to search feature |
| search_id | numeric | 10 | <-- Links Buyer To Search Criteria |
| view_lb_ts | datetime | 8 | <-- When Buyer Last Checked Home Finder |
| view_tags_ts | datetime | 8 | <-- When Buyer Last Checked Tagged List |

FIG. 12

| Column Name | Type | Length | |
|---|---|---|---|
| search_id | numeric | 10 | <-- Links Profile To Buyer |
| owner_uid | varchar | 10 | <-- Agent's User ID |
| prop_type | varchar | 5 | <-- Single Family or Condo/Townhome |
| price_low | varchar | 10 | <-- Minimum Price |
| price_high | varchar | 10 | <-- Maximum Price |
| chg_ts | datetime | 8 | <-- Date/time to check for changes |
| like_crt_id | varchar | 200 | <-- Criteria the Buyer Wants |
| must_crt_id | varchar | 200 | <-- Criteria the Buyer Must Have |
| area_crt_id | varchar | 255 | <-- MLS areas in which Buyer is Looking |
| adv_area | varchar | 255 | <-- Other Areas in which Buyer is Looking |
| a_view_lb_ts | datetime | 8 | <-- last time agent viewed homefinder |
| first_name | varchar | 25 | <-- Buyer's Agent's First Name |
| last_name | varchar | 40 | <-- Buyer's Agent's Last Name |
| a_view_tags_ts | datetime | 8 | <-- last time agent accessed tag list |
| a_view_views_ts | datetime | 8 | <-- last time agent accessed viewed list |
| create_ts | datetime | 8 | <-- When Profile Was Created |
| areas | text | 16 | (Not relevent to Buyer List) |
| a_num_views_lb | int | 4 | <-- Times Agent Accessed Service |

FIG. 13

```
Column Name    |Type     |Length
---------------+---------+-------
uid            |varchar  |10      <-- Buyer's User Id
mlno           |varchar  |10      <-- MLS Listing Number
num_views      |int      |4       (Not relevent to Buyer List)
last_view_sid  |numeric  |10      (Not relevent to Buyer List)
profile_id     |numeric  |10      (Not relevent to Buyer List)
last_view_ts   |datetime |8       <-- checked to find views that the agent has
not_seen
```

FIG. 14

| Column Name | Type | Length | |
|---|---|---|---|
| profile_id | numeric | 10 | <-- Buyer's Profile ID |
| uid | varchar | 10 | <-- Buyer's User Id |
| tag_type | varchar | 1 | <-- Whether Agent or Buyer Tagged Listing |
| tag_ts | datetime | 8 | <-- checked to find tags that the agent has |
| not_seen | | | |
| mlno | varchar | 10 | <-- Listing's MLS Number |

FIG. 15

| Column Name | Type | Length |
|---|---|---|
| mlno | varchar | 10 |
| ml_stat | char | 1 |
| ptype | char | 1 |
| st_no | varchar | 6 |
| st | varchar | 29 |
| unit_num | varchar | 5 |
| city | varchar | 30 |
| county | varchar | 20 |
| tax_loc | varchar | 20 |
| deed_ref | varchar | 10 |
| pr | int | 4 |
| office_code | varchar | 6 |
| agt | varchar | 6 |
| list_phone | varchar | 14 |
| area | varchar | 2 |
| sub_area | varchar | 2 |
| sectn | varchar | 25 |
| elem_sch | varchar | 15 |
| midd_sch | varchar | 15 |
| high_sch | varchar | 15 |
| excl_rt | varchar | 1 |
| sub_a_co | varchar | 10 |
| hoa | varchar | 3 |
| bd_rm | tinyint | 1 |
| bt_rm_full | tinyint | 1 |
| bt_rm_half | tinyint | 1 |
| t_sq | int | 4 |
| addtl_sq | int | 4 |
| totuhsq | int | 4 |
| h_bs_sq | int | 4 |
| h_lo_sq | int | 4 |
| h_mn_sq | int | 4 |
| h_up_sq | int | 4 |
| uh_bs_sq | int | 4 |
| uh_lo_sq | int | 4 |
| uh_mn_sq | int | 4 |
| uh_up_sq | int | 4 |
| buy_a_c | varchar | 10 |
| complete | datetime | 8 |
| ls_dte | datetime | 8 |
| tax_num | varchar | 30 |
| zip_code | varchar | 5 |
| zip_code_p4 | varchar | 4 |
| acreage | float | 8 |
| zoning | varchar | 7 |
| tax_value | float | 8 |
| comp_code | varchar | 8 |
| ann_tax | float | 8 |
| sell_phone | varchar | 14 |
| sell_name | varchar | 25 |
| leg_desc | varchar | 30 |
| new_const | varchar | 1 |
| ext_rm | varchar | 15 |
| srce_sqft | varchar | 4 |
| lot_size | varchar | 30 |
| main_br2 | varchar | 1 |
| main_br3 | varchar | 1 |
| main_br4 | varchar | 1 |

FIG. 16A

| Column Name (Cont) | Type | Length | |
|---|---|---|---|
| main_eh | varchar | 1 | |
| main_lr | varchar | 1 | |
| main_dr | varchar | 1 | |
| main_kt | varchar | 1 | |
| main_bk | varchar | 1 | |
| main_dn | varchar | 1 | |
| main_gr | varchar | 1 | |
| main_rc | varchar | 1 | |
| main_br | varchar | 1 | |
| main_fb | varchar | 1 | |
| main_hb | varchar | 1 | |
| up_fb | varchar | 1 | |
| up_hb | varchar | 1 | |
| low_fb | varchar | 1 | |
| low_hb | varchar | 1 | |
| bm_fb | varchar | 1 | |
| bm_hb | varchar | 1 | |
| exp_date | datetime | 8 | |
| p_dte | datetime | 8 | |
| s_dte | datetime | 8 | |
| s_pr | int | 4 | |
| s_moff | varchar | 4 | |
| s_off | varchar | 6 | |
| s_agt | varchar | 6 | |
| sldterm | varchar | 10 | |
| sldcont | float | 8 | |
| out_dte | datetime | 8 | |
| feat1 | varchar | 18 | |
| feat2 | varchar | 18 | |
| feat3 | varchar | 18 | |
| feat4 | varchar | 18 | |
| feat5 | varchar | 18 | |
| feat6 | varchar | 30 | |
| feat7 | varchar | 30 | |
| feat8 | varchar | 18 | |
| feat9 | varchar | 48 | |
| feat10 | varchar | 48 | |
| feat11 | varchar | 30 | |
| feat12 | varchar | 48 | |
| feat13 | varchar | 30 | |
| feat14 | varchar | 30 | |
| feat15 | varchar | 18 | |
| feat16 | varchar | 30 | |
| feat17 | varchar | 18 | |
| feat18 | varchar | 18 | |
| feat19 | varchar | 48 | |
| feat20 | varchar | 48 | |
| actn_dte | datetime | 8 | |
| init_pr | int | 4 | |
| last_pr | int | 4 | |
| cplx_nme | varchar | 30 | |
| which_fl | varchar | 15 | |
| land_incl | varchar | 1 | |
| sh_st | varchar | 29 | |
| change_ts | datetime | 8 | <-- checked to find activity agent not seen |
| change_wch | varchar | 10 | |
| pchg_ts | datetime | 8 | |
| built_ts | datetime | 8 | |

FIG. 16B

```
Column Name             |Type      |Length
------------------------+----------+---------
pw                      |varchar   |10
in_ts                   |datetime  |8
login_ts                |datetime  |8        <-- Checked for recent login
name                    |varchar   |40
email                   |varchar   |100
first_name              |varchar   |25
uid                     |varchar   |10
adr1                    |varchar   |30
adr2                    |varchar   |30
city                    |varchar   |20
state                   |varchar   |15
zip                     |varchar   |9
wk1                     |varchar   |3
wk2                     |varchar   |3
wk3                     |varchar   |4
hm1                     |varchar   |3
hm2                     |varchar   |3
hm3                     |varchar   |4
pager1                  |varchar   |3
pager2                  |varchar   |3
pager3                  |varchar   |4
fax1                    |varchar   |3
fax2                    |varchar   |3
fax3                    |varchar   |4
grant_a_comps           |varchar   |1
grant_o_comps           |varchar   |1
grant_search            |varchar   |1
cma_id                  |numeric   |10       <-- Links seller to CMA profile
view_off                |datetime  |8
view_active             |datetime  |8
```

FIG. 17

```
Column Name              |Type      |Length
-------------------------+----------+--------
cma_id                   |numeric   |10
owner_uid                |varchar   |10
status                   |varchar   |1
create_ts                |datetime  |8
chg_ts                   |datetime  |8
mlno                     |varchar   |10
st_num                   |varchar   |10
st_name                  |varchar   |30
prop_type                |varchar   |5
price_low                |varchar   |10
price_high               |varchar   |10
area_crt_id              |varchar   |255
sub_div                  |varchar   |40
bedrooms                 |varchar   |5
full_baths               |varchar   |5
half_baths               |varchar   |5
heated_space             |varchar   |10
acreage                  |varchar   |10
age                      |varchar   |10
levels_crt_id            |varchar   |10
exterior_crt_id          |varchar   |10
basement_crt_id          |varchar   |10
heat_crt_id              |varchar   |10
water_crt_id             |varchar   |10
parking_crt_id           |varchar   |10
misc_crt_id              |varchar   |255
zip_sell                 |varchar   |10
s_area_active            |varchar   |1
s_area_off               |varchar   |1
s_level_active           |varchar   |1
s_level_off              |varchar   |1
a_view_off               |datetime  |8
a_view_active            |datetime  |8
price_suggested          |varchar   |10
a_view_activity          |datetime  |8      <-- Last time agent viewed area activity
```

FIG. 18

| Column Name | Type | Length |
|---|---|---|
| mlno | varchar | 10 |
| ml_stat | char | 1 |
| ptype | char | 1 |
| st_no | varchar | 6 |
| st | varchar | 29 |
| unit_num | varchar | 5 |
| city | varchar | 30 |
| county | varchar | 20 |
| tax_loc | varchar | 20 |
| deed_ref | varchar | 10 |
| pr | int | 4 |
| office_code | varchar | 6 |
| agt | varchar | 6 |
| list_phone | varchar | 14 |
| area | varchar | 2 |
| sub_area | varchar | 2 |
| sectn | varchar | 25 |
| elem_sch | varchar | 15 |
| midd_sch | varchar | 15 |
| high_sch | varchar | 15 |
| excl_rt | varchar | 1 |
| sub_a_co | varchar | 10 |
| hoa | varchar | 3 |
| bd_rm | tinyint | 1 |
| bt_rm_full | tinyint | 1 |
| bt_rm_half | tinyint | 1 |
| t_sq | int | 4 |
| addtl_sq | int | 4 |
| totuhsq | int | 4 |
| h_bs_sq | int | 4 |
| h_lo_sq | int | 4 |
| h_mn_sq | int | 4 |
| h_up_sq | int | 4 |
| uh_bs_sq | int | 4 |
| uh_lo_sq | int | 4 |
| uh_mn_sq | int | 4 |
| uh_up_sq | int | 4 |
| buy_a_c | varchar | 10 |
| complete | datetime | 8 |
| ls_dte | datetime | 8 |
| tax_num | varchar | 30 |
| zip_code | varchar | 5 |
| zip_code_p4 | varchar | 4 |
| acreage | float | 8 |
| zoning | varchar | 7 |
| tax_value | float | 8 |
| comp_code | varchar | 8 |
| ann_tax | float | 8 |
| sell_phone | varchar | 14 |
| sell_name | varchar | 25 |
| leg_desc | varchar | 30 |
| new_const | varchar | 1 |
| ext_rm | varchar | 15 |
| srce_sqft | varchar | 4 |
| lot_size | varchar | 30 |
| main_br2 | varchar | 1 |
| main_br3 | varchar | 1 |
| main_br4 | varchar | 1 |

FIG. 19A

| Column Name (Cont) | Type | Length | |
|---|---|---|---|
| main_eh | varchar | 1 | |
| main_lr | varchar | 1 | |
| main_dr | varchar | 1 | |
| main_kt | varchar | 1 | |
| main_bk | varchar | 1 | |
| main_dn | varchar | 1 | |
| main_gr | varchar | 1 | |
| main_rc | varchar | 1 | |
| main_br | varchar | 1 | |
| main_fb | varchar | 1 | |
| main_hb | varchar | 1 | |
| up_fb | varchar | 1 | |
| up_hb | varchar | 1 | |
| low_fb | varchar | 1 | |
| low_hb | varchar | 1 | |
| bm_fb | varchar | 1 | |
| bm_hb | varchar | 1 | |
| exp_date | datetime | 8 | |
| p_dte | datetime | 8 | |
| s_dte | datetime | 8 | <-- Used to find prop. sold in last 30 days |
| s_pr | int | 4 | |
| s_moff | varchar | 4 | |
| s_off | varchar | 6 | |
| s_agt | varchar | 6 | |
| sldterm | varchar | 10 | |
| sldcont | float | 8 | |
| out_dte | datetime | 8 | |
| feat1 | varchar | 18 | |
| feat2 | varchar | 18 | |
| feat3 | varchar | 18 | |
| feat4 | varchar | 18 | |
| feat5 | varchar | 18 | |
| feat6 | varchar | 30 | |
| feat7 | varchar | 30 | |
| feat8 | varchar | 18 | |
| feat9 | varchar | 48 | |
| feat10 | varchar | 48 | |
| feat11 | varchar | 30 | |
| feat12 | varchar | 48 | |
| feat13 | varchar | 30 | |
| feat14 | varchar | 30 | |
| feat15 | varchar | 18 | |
| feat16 | varchar | 30 | |
| feat17 | varchar | 18 | |
| feat18 | varchar | 18 | |
| feat19 | varchar | 48 | |
| feat20 | varchar | 48 | |
| actn_dte | datetime | 8 | |
| init_pr | int | 4 | |
| last_pr | int | 4 | |
| cplx_nme | varchar | 30 | |
| which_fl | varchar | 15 | |
| land_incl | varchar | 1 | |
| sh_st | varchar | 29 | |
| change_ts | datetime | 8 | <-- Used to find prop. changes in last 30 days |
| change_wch | varchar | 10 | |
| pchg_ts | datetime | 8 | |
| built_ts | datetime | 8 | |

FIG. 19B

CyberCMA Reports and Query Rules

I. CyberCMA Reports

CyberCMA Report

SUBJECT PROPERTY

| ADDRESS | SUB-DIV | LVLS | BDRMS | BATH | AGE | SQFT | LIST$ | $SQ/FT | DOM |
|---|---|---|---|---|---|---|---|---|---|
| 234 Knob View Ct. | Knob View | 2.0 | 4 | 3.1 | 8 | 4320 | N/A | N/A | N/A |

FOR SALE PROPERTIES

| ADDRESS | SUB-DIV | LVLS | BDRMS | BATH | AGE | SQFT | LIST$ | $SQ/FT | DOM |
|---|---|---|---|---|---|---|---|---|---|
| 913 Knob View Ct. | Knob View | 2.0 | 5 | 4.1 | 9 | 4376 | 419,500 | 95.86 | 220 |
| 120 Glousman Rd | Willow Gle | 2.0 | 4 | 3.1 | 10 | 4283 | 444,900 | 103.88 | 84 |

VERAGE LIST$: 432,200   AVERAGE $/SQ.FT.: 99.83   AVERAGE MARKET TIME: 152

SOLD PROPERTIES

| ADDRESS | LVLS | BDRMS | BATH | AGE | SQFT | LIST$ | SALE$ | $SQ/FT | DOM |
|---|---|---|---|---|---|---|---|---|---|
| 509 Barrington Way | 2.0 | 5 | 4.2 | 8 | 4650 | 469,900 | 425,000 | 91.40 | 124 |
| 234 Allistair Road | 2.0 | 5 | 5.0 | 10 | 4840 | 480,000 | 450,000 | 92.98 | 83 |

VERAGE LIST$: 474,950   AVERAGE $/SQ.FT.: 100.10   AVERAGE MARKET TIME: 104

VERAGE SALE$: 437,500   AVERAGE $/SQ.FT.: 92.20   SALE$ TO LIST$: 92%

```
                                              $437,500
Sold            $425,000 ------------------------------- $450,000
Properties      Lo Price              Average            Hi Price $432,200
r Sale          $419,500 ------------------------------- $444,900
Properties      Lo Price              Average            Hi Price $429,300
Subject         $398,300 ------------------- $432,500
Property        Lo Price       Average       Hi Price
``` nformation believed to be accurate but subject to verification by all parties.

Note: Properties could be removed by viewing the detail and clicking on the "Un CMA" button

FIG. 23 ii. QUERY RULES

Use these rules to establish SQL criteria:

Note: If listed property ( ML# load ) or optional Price Range entered
      by agent, use price as indicated below. If no Price Range,
      substitute Heated Sq Ft for Price Range and make sure Heated Sq Ft
      is not used twice in the query.

R_ACTV

```
If sub-division#"N/A"
    If count for type and sub-division ( in same area(s) ) and
    acre< Subject acre+/-1 and price = subject price +/-20% > 9
      as_area = sub-division ( in same area(s) )
    else
        If count for type and (area and sub_area and zip_code) and
        acre< Subject acre+/-1 and price = subject price +/-20% > 9
          as_area = area and sub-area and zip_code
        else
            If count for type and (area and sub_area ) and acre< Subject
            acre+/-1 and price = subject price +/-20% > 9
              as_area = area and sub-area
            else
              as_area = area
    endif
else
    If count for type and (area and sub_area and zip_code) and
    acre< Subject acre+/-1 and price = subject price +/-20% > 9
      as_area = area and sub-area and zip_code
    else
        If count for type and (area and sub_area ) and acre< Subject
        acre+/-1 and price = subject price +/-20% > 9
          as_area = area and sub-area
        else
          as_area = area
        endif
    endif
endif
```

FIG. 24

METHOD AND SYSTEM FOR PROVIDING REAL ESTATE INFORMATION USING A COMPUTER NETWORK, SUCH AS THE INTERNET

RELATED PATENT APPLICATION(S)

This application is a continuation of, and claims priority to, U.S. patent application Ser. No. 09/724,268, filed Nov. 28, 2000, which in turn claims priority to, and incorporates in full by reference, U.S. Provisional Patent Application Ser. No. 60/200,169, entitled "Methods and Systems for Providing Real Estate Listing Information and Related Services Using a Computer Network, Such as the Internet," filed Apr. 27, 2000.

FIELD OF THE INVENTION

The present invention relates generally to the field of real estate. More particularly, the present invention relates to a method and system for providing real estate information using a computer network, such as the Internet.

COPYRIGHT NOTIFICATION

A portion of the disclosure of this patent document and its figures contain material that is subject to copyright protection. The copyright owner has no objection to the facsimile reproduction by anyone of the patent document or the patent disclosure, as it appears in the Patent and Trademark Office patent files or records, but otherwise reserves all copyrights whatsoever.

BACKGROUND

Conventionally, real estate agents use the multiple listing service (MLS) system to locate properties of interest for their clients, to conduct comparative market analysis (CMA) for particular properties, and to carry out other real estate services. Agents typically conduct searches for properties using a computer interface terminal associated with the MLS. For example, an agent may specify a particular price range, MLS area, minimum number of bedrooms, and minimum square footage, and the MLS computer system will return a search result of properties in the MLS database fitting those specifications. The agent may print the search results and save the search criteria for future use, if desired, using the MLS system in order to carry out the agent's work.

In conventional systems, an agent can save search specifications. Thus, when monitoring real estate listings for a client, the agent may periodically conduct the search again, using saved search specifications, in order to find new information. The agent may adjust the date range of the search to seek only recently-changed property information. For example, the agent may set the start date as the date of the agent's last search in order to seek properties added to the MLS database since that date.

In addition, some agents examine a printed sheet issued daily that contains a list of listing modifications (new property listings and changes to listings) (often called a "hot sheet"). The agent may see a property of interest on the printed sheet, and access more complete property information for the listing using the MLS system. When examining the "hot sheet," the agent typically either attempts to remember the types of properties in which their clients are interested or compares written profiles of their clients with the hot sheet.

Thus, in this conventional system, the real estate agent pulls information from the MLS database. That is, the agent specifies a desired profile, and information is extracted (or "pulled") from the MLS database, formatted, and provided to the agent.

Moreover, in conventional systems, agents must conduct searches for each of their clients individually. For example, if an agent wishes to see if any new listings or changed listings are present for four of the agent's clients, the agent conducts a first search for the first client, and a second search for the second client, and so on. Such searching methodology is disadvantageous in that it is time consuming.

The volume of changes to the typical regional MLS database can be great. For example, new properties may be added daily, and price and other information on specific listings may be adjusted just as frequently. Buyers and sellers often demand that their agents provide notification to them as soon as such changes take place.

The Internet has changed the expectations of real estate buyers and sellers. Real estate buyers and sellers now demand more information and any information provided to be provided more quickly. Buyers and sellers want their agents to provide very specific information, to understand their needs, and to provide very fast answers to their questions.

In addition to changing the expectations of buyers and sellers of real estate in relation to speed and knowledge, the Internet has given buyers and sellers access to information that previously was available only through a real estate agent. For example, Internet services now allow real estate buyers and sellers to search MLS information by specifying property profiles. Thus, it is increasingly important for real estate agents to provide more timely, value-added services to their clients.

In relation to communicating with clients as to which property a client is particularly interested, using conventional systems and methods, agents spend several minutes contacting each of their clients by phone, e-mail or fax to determine if the buyer likes any of the properties brought to the client's attention by the agent. The agent spends such time finding out if the buyer has seen any interesting properties in print ads or on the Internet, as well. Such conventional systems and methods are disadvantageous in that such systems and methods are time consuming and communication difficulties (e.g., not finding a mutually convenient time to talk on the telephone) often arise.

The conventional systems have further disadvantages. For example, as mentioned, such systems typically use "pull" systems, requiring the agent to pull data from a database, rather than "push" systems whereby data of interest is automatically provided to the agent (and their buyers, if desired) in a highly organized and useful manner. Moreover, conventional systems do not provide information organized in a manner that allows agents to provide the speed of response demanded by today's consumer.

While the agent is able to search for properties using a conventional computerized system, much of the organization of the search results, correlating the results with client needs, and related tasks are often conducted on paper. That is, even using the MLS computerized system, much of the agent's organizational work is conducted on paper and the agent's memory is relied on a great deal.

In order to carry out these processes using conventional means, agents must be technically proficient and must organize the information obtained in a helpful way. That is, agents must make note of date ranges of searches, recall information about clients, conduct multiple searches on a serial basis, and otherwise take various steps to organize their property search and identification process.

Agents perform comparative market analysis (CMA) using conventional systems. In conventional systems, an agent or other person searches the MLS database for past sales and current listings that are comparable to the property at issue. The searcher determines the search criteria (e.g., location).

CMAs are performed in relation to a specific property for a variety of reasons. For example, an agent may wish to become the listing agent for a property that has yet to be placed on sale. The agent may use CMAs to provide the potential seller with information and advice so that the potential seller will chose the agent as listing agent. As another example, an agent may use CMAs to determine an asking price for a property that is listed with the agent. In addition, the CMA criteria may be used to determine activity near or associated with a particular property. For example, once a house is placed on sale, the seller and the listing agent may wish to monitor the surrounding area for houses placed on sale and/or sold.

In conventional systems, an agent prepares a CMA report containing information about properties that are comparable to the property at issue. Sometimes, the CMA is conducted only once in relation to a property that is placed on sale. In other instances, a CMA will be conducted for a property that is placed on sale sporadically to provide an update. The frequency is often determined by the agent, the seller, and available time.

Like the systems used to locate properties of interest for potential buyers, searches are typically done one property at a time, and the results are printed for future reference. In some systems, the search criteria may be saved and retrieved for future searching. The disadvantages of great time consumption and difficulty in organization, as well as other disadvantages associated with conventional buyer list systems discussed above, are present in such conventional CMA systems.

Many conventional computer-based, real-estate systems include appointment-monitoring functions. For example, when an appointment is made or changed, the data describing the appointment is printed and placed in the listing agent's mail box. Afterwards, the listing agent must call the showing agent to obtain buyer comments after a listing is shown. In some conventional appointment systems, agents may retrieve appointment information using a company appointment system computer, but such data is generally not accessible from any computer via the Internet. Such conventional systems have a variety of disadvantages. For example, printing appointment information is time consuming, costly, and inefficient. Agents must often come into the office to obtain such appointment information. Moreover, communication with the showing agent can be complicated by unavailability of the showing agent and time constraints.

There is a variety of other agent-credibility and value disadvantages in the use of conventional systems. For example, conventional systems often result in an agent's clients becoming aware of area activity before an agent becomes aware of such activity, thereby lessening the value and credibility of the agent.

What is needed is a system and method for providing real estate information that does not include these disadvantages, and that offers other advantages.

SUMMARY

The present invention provides processes and systems for providing real-estate information using a computer network, such as the Internet. One embodiment provides a buyer information web page showing relevant buyer information in an easy-to-read, summary format. Buyer information provided includes summaries of various aspects of real estate listings needed by a real estate agent to effectively represent and assist a buyer. Potential buyer information summarized on such a web page comprises a potential buyer name, a new activity summary associated with the potential buyer name, a new views summary associated with the potential buyer name, a new tags summary associated with the potential buyer name, and a last login summary associated with the potential buyer name.

The new activity summary may comprise a number indicating the number of properties meeting a buyer profile associated with the potential buyer name that have been modified (i.e., added to an available property database (e.g., the MLS database or similar database having property information) or that have been changed in the available property database) since a previous view of a new activity web page associated with the potential buyer name by the agent. The new activity web page comprises a list of properties meeting the buyer's profile criteria. Also, the new activity summary may comprise a date indicating the earliest date that a property meeting the buyer profile associated with the potential buyer name was added to, or changed in, the MLS database or similar database since a previous view of the new activity web page associated with the potential buyer name by the agent. For example, if the agent viewed the new activity web page on Oct. 15, 2000, and a eleven property listings were either added to a property database or modified in the property database, the first of which was added on Oct. 20, 2000, the number determined would be eleven and the date determined would be Oct. 20, 2000.

The new views summary may comprise a number indicating the number of properties viewed by the potential buyer using an online property information viewing system since a previous view of a new views web page associated with the potential buyer name by the agent. That is, the new views web page comprises a web page summarizing properties viewed in detail by the buyer using an online property information viewing system. The new views summary may also comprise a date indicating the earliest date that the buyer viewed the informational details of a property using the online property information viewing system since a previous view of the new views web page associated with the potential buyer name by the agent. This date is determined by examining a new views database to determine the date on which the buyer viewed such details.

Similarly, the new tags summary may comprise a new tags number indicating the number of properties tagged by the person associated with the potential buyer name using the online property information viewing system since a previous view of a new tags web page associated with the potential buyer name by the agent. A new tags web page comprises a web page listing properties tagged as of interest using an online system. The new tags summary may also comprise a date indicating the earliest date that the buyer tagged a property as of interest since a previous view of the new tags web page associated with the potential buyer name by the agent. This date is determined by examining a new tags database to determine the first tag added since the last view of the new tags web page by the agent. Also, the last login summary associated with the potential buyer name may comprise a date indicating the last time the person associated with the potential buyer name used the online property information system.

Note that in the preferred embodiment, all of the dates in the summaries show the date on which the information provided first became available after the last view of the relevant web page by the agent (i.e., the date shows when the first piece of information in the category at issue became available to the agent). The dates provide the agent with summary information on urgency and similar information.

Embodiments of the present invention comprise an online property information viewing system. In a preferred embodiment, the property information viewing system comprises two sub-systems for obtaining property information. The first, or primary, sub-system comprises a system whereby the buyer is provided access to search results showing property information that is the result of a comprehensive set of search criteria entered by the agent for the buyer. The search criteria is saved and the results updated when the buyer logs into the viewing system and activates a request for the first system (e.g., by a clicking on a hyperlink). The second sub-system in the property information viewing system comprises a computerized system that allows buyers to input search criteria (e.g., price range, minimum number of bedrooms, minimum number of bathrooms, and minimum square footage), to receive a list of properties meeting the search criteria, and to view detailed property information in relation to the properties on the list selected by the buyer. The sub-system accesses a property information database to provide such information to the buyer. Such a system is accessible by the buyer via the Internet. In an embodiment, the buyer's agent provides the buyer with access to the online property information viewing system. The buyer's activity using the online property information viewing system is monitored and recorded.

In an embodiment, the information shown on the buyer information web page is organized into a grid, comprising rows and columns. One embodiment comprises a buyer name column comprising the potential buyer name and a new activity column comprising the new activity information (e.g., a new activity summary). The grid may also include a new tags column comprising the new tag information (e.g., a new tag summary) and a new views column comprising the new views information (e.g., a new views summary).

The new activity summary comprises a hyperlink, and a new activity web page is provided upon activation of the hyperlink. As mentioned, the new activity web page summarizes properties falling within a potential buyer profile associated with the potential buyer name. The profile comprises criteria, such as price range, number of bedrooms, and geographic area, and features desired or required by the buyer. The list of properties provided includes at the top of the list properties added to the list after the last viewing of the list by the real estate agent, and the added properties are highlighted as well, e.g., by change of color or with an icon.

In an embodiment, the new tags summary also comprises a hyperlink. The hyperlink is linked to a new tags web page which, as mentioned, comprises a list of properties of interest selected (or "tagged") by a person associated with the potential buyer name or by a real estate agent. Like the new activity list, the list of properties of interest shows at the top of the list properties added to the list after the last viewing of the list by the agent, and the added properties are highlighted. The new views summary likewise comprises a hyperlink linked to a new views web page comprising, as mentioned, a summary list of properties viewed in detail by the buyer using the online property information viewing system.

As shown generally in FIGS. 9 and 11, embodiments also provide a CMA List, which as shown is a list regarding sellers and their properties. In an embodiment, a web page showing subject property information in an easy-to-use, summary format is provided. The subject property information comprises a property identifier for one or more properties of interest. The property identifier may comprise an address or other identifier for a property. The subject property information also comprises a new appointments summary associated with the property identifier, an area activity summary associated with the property identifier, a seller name associated with the property identifier, and a last login summary associated with the property identifier. The area activity summary comprises a number indicating the number of properties in a pre-defined area undergoing a pre-defined event (e.g., an addition to a property database or a change in status, such as a sale) since a previous view of a new area activity web page associated with the property identifier by the agent. The search may also be limited to pre-defined profile criteria and a pre-defined time range. The new area activity summary also comprises a date indicating the earliest date that a property in the pre-defined area underwent one of the pre-defined events since a previous view of the area activity web page associated with the property list. The date comprises the earliest date of modification (change or addition) date associated with the property (ies) in the property database that were added to the database or changed in the database, that are within the pre-defined area, and that meets the pre-defined search criteria, and were modified after the previous view of the area activity web page associated with the buyer name by the agent.

The new appointments summary comprises a new appointments number indicating the number of appointments carried out in relation to the property associated with the property identifier since a previous view of a new appointments web page associated with the property identifier. The seller accounts summary comprises identification of an owner of the property associated with the property identifier. The new appointments summary may also comprise a date that reflects the earliest appointment in the appointments database that is after the previous view of the new appointments web page.

Like the buyer list web page embodiment discussed, an embodiment of the CMA list web page is organized in a grid having rows and columns. The columns include an area activity column comprising the new area activity summaries, and an appointments column comprising the new appointments summaries. Such summaries comprise hyperlinks linked to an area activity web page and an appointments web page, respectively.

The area activity web page comprises a list of properties within a pre-defined profile (e.g., price range, geographic area, builder, number of bedrooms, and square footage) undergoing a pre-defined event (e.g., an addition to a property database and a change in status, such as a sale) in a pre-defined time period (e.g., last thirty days). The new appointments web page comprises a list of appointments carried out in relation to the property associated with the property identifier. The newly-added properties on the area activity web page and the newly-added appointments on the appointments web page are shown at the top of the list and are highlighted.

Embodiments of the present invention offer a variety of advantages. Importantly, embodiments save many hours of work by real estate agents by automating property information functions and by offering easily-viewable, summary information helpful to real estate agents.

In relation to searching for new property activity for buyers, embodiments of the present invention automatically checks for new listings and/or listing changes for all of an agents' buyers, including searching from the last time the agent checked listings for each buyer. If new listings and/or listing changes are found, a hyperlink with the number of unseen properties and their earliest date is displayed. Embodiments allow agents to avoid spending time selecting properties to send to each buyer. Moreover, agents and their buyers are better informed while using less of the agents' time.

In relation to receiving communication from a client as to which property the client is particularly interested, embodiments of the present invention offer computerized "tagging" methods whereby buyers indicate properties of particular interest and links to the indicated properties are automatically provided to the agent in a convenient format. Such embodiments and similar embodiments provide time savings to agents, are less disruptive to buyers, and speeds and improves communication between agents and their clients.

Another advantage of the present invention is that embodiments allow agents to provide their customers with a private web-based service that is monitored for the agent's benefit. A further advantage of the present invention is that embodiments provide agents a means of determining their clients' true interests by monitoring the properties viewed by their clients using a property information system provided by the agent. A still further advantage of the present invention is that embodiments allow agents to determine the last date on which a client logged into a property information system, and thereby determine which buyers are likely to buy and which buyers are merely browsing.

The inclusion of an appointment activity summary in embodiments of the present invention offers the advantage of time savings for agents. For example, agents may obtain appointment information via the Internet, rather than visiting the office. Moreover, staff time and costs are reduced in that printing cost and office staff time in printing appointment information is eliminated.

Another advantage of the present invention is that embodiments automatically check for area activity (e.g., new listings and/or listing changes) for all of an agents' CMA properties, and a summary of such activity is provided. Moreover, using such embodiments allows agents to obtain much time savings and to receive area activity information quickly, thereby allowing the agent to provide increased value to their clients.

Additional objects, advantages, and novel features of the invention will be set forth in part in the description which follows, and in part will become more apparent to those skilled in the art upon examination of the following, or may be learned by practice of the invention.

BRIEF DESCRIPTION OF FIGURES

FIG. 2A is an exemplary illustration of adding a buyer, consistent with embodiments of the present invention.

FIG. 3 shows an embodiment of a new activity web page according to the present invention.

FIGS. 12-15 and 16A and 16B show an embodiment of data tables used in an embodiment of the present invention to provide a buyer list web page and associated web pages according to the present invention.

FIGS. 17-18 and 19A and 19B show an embodiment of data tables used in an embodiment of the present invention to provide a CMA list web page and associated web pages according to the present invention.

FIG. 23 illustrates an example of a Cyber CMA Report, consistent with an embodiment of the present invention.

FIG. 24 includes a set of exemplary Query Rules used in an embodiment consistent with the present invention.

DETAILED DESCRIPTION

Figure 1:
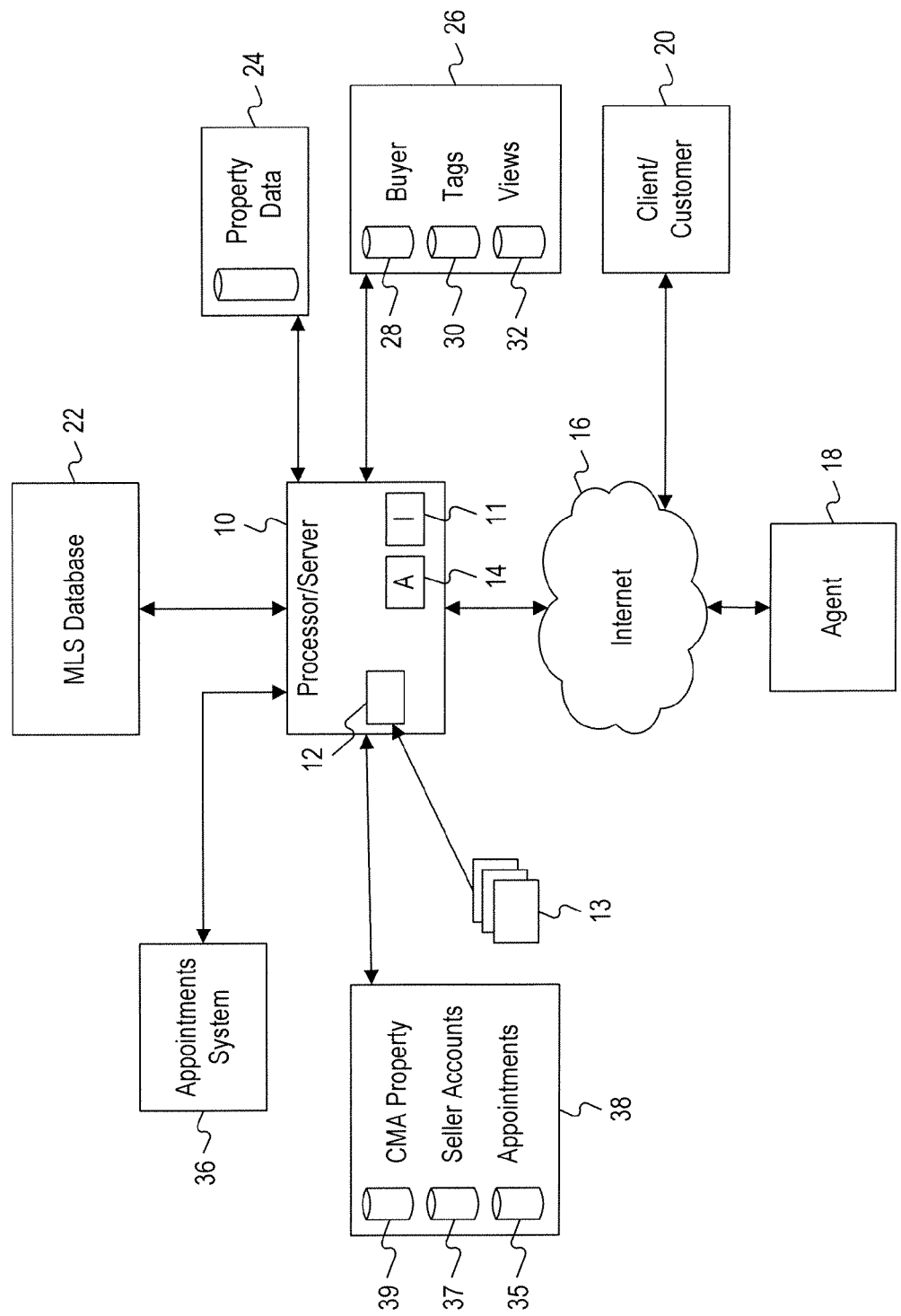
FIG. 1 shows a block diagram of an embodiment of a system according to the present invention.

Embodiments of the present invention comprise systems and processes for providing real-estate information via the Internet. FIG. 1 shows a diagram of an embodiment of a system according to the present invention.

FIG. 1 shows a web server 10 connected to the Internet 16. The web server 10 comprises a web site 12 and various database, communications, and other applications 14 that assist in carrying out processes according to the present invention as described herein. The web site 12 comprises web pages 13, both static web pages and dynamic web pages. Static web pages are web pages that comprise a file consistently available at the web site 12 on the server 10. Dynamic web pages are web pages built by one or more of the applications 14 and provided as part of the web site 12. Generally, the dynamic pages are built by accessing one or more databases. The server 10 is in communication with various buyer list databases 26, including a buyer database 28, a tags database 30, and a views database 32. The server is also in communication with a seller database 38, including a CMA property database, a seller account database, and an appointments database. These databases are discussed further below. As shown in FIG. 1, the server is also in communication with an appointments system 36.

A computer 18 accessible by a real estate agent and a computer 20 accessible by a client/customer of the real estate agent are in communication with the Internet 16. The web site 12 is accessible via the Internet 16 by the real estate agent and the client/customer of the agent via their computers 18, 20 and is viewable by Internet browsers (e.g., Microsoft Internet Explorer or Netscape Navigator) residing on the computers 18, 20. The term agent is used with reference to item 18 to refer to the agent's computer (and browser), the agent, or both. Likewise, the term client or customer (or particular client or customer name) is used with reference to item 20 to refer to the client/customer's computer, the client/customer, or both.

The server 10 is in communication with a database of real estate data 22 containing information on listed and previously listed properties. In the embodiment shown, the database 22 comprises the Multiple Listing Service (MLS) database, which is a well-known database of real estate information.

The server 10 is also in communication with a property data database 24 (also called the "for-sale" database). Periodically, the server 10 accesses the MLS database 22, retrieves any updated information, and writes the data from the MLS database 22 to the property data database 24. Thus, the property data database 24 comprises the data from the MLS database.

The server 10 also includes an online property information viewing system 11. In a preferred embodiment, the property information viewing system 11 comprises two sub-systems for obtaining property information. The first, or primary, sub-system comprises a system whereby the buyer 20 is provided access to search results showing property information that is the result of a comprehensive set of search criteria entered by the agent 18 for the buyer 20. The search criteria entered by the agent for the buyer 20 is saved and the results updated when the buyer 20 logs into the viewing system and activates a request for the first system (e.g., by a clicking on a hyperlink). The second sub-system in the property information viewing system 11 comprises a computerized system that allows buyers to input search criteria (e.g., price range, minimum number of bedrooms, minimum number of bathrooms, and minimum square footage), to receive a list of properties meeting the search criteria, and to view detailed property information in relation to the properties on the list selected by the buyer. The sub-system accesses a property information database 24 to provide such information to the buyer. Such a system 11 is accessible by the buyer 20 via the Internet 16. In an embodiment, the buyer's agent provides the buyer with access to the online property information viewing system. The buyer's activity using the online property information viewing system 11 is monitored and recorded. For example, the buyer's view of detailed property information for a particular property is recorded in the views database 32. Similarly, the buyer's tagging of a particular property is recorded in the tags database 26. The buyer's access of the system 11 is likewise recorded. In an embodiment, the buyer's agent provides the buyer with access to the online property information viewing system 11, and may provide the buyer with access to the first system or both the first and second systems in the system 11.

In an embodiment of the present invention, a real estate agent uses the agent's personal computer (PC) 18 to log onto the web site 12 using a user name and password assigned to the agent. In the embodiment shown, the agent's first and last name serves as the log-in agent name for the agent.

In the embodiment shown, prior to the log-in session under discussion, the agent logged into the web site 12 and specified a profile for a plurality of the agent's clients or potential clients (called buyers or potential buyers herein). The profile comprises buyer information such as first and last name of the potential buyer, property type of interest (e.g., single family or condo), price range, geographic area(s) of interest, and property features of interest (e.g., minimum number of bedrooms, minimum number of bathrooms, and minimum square footage). The buyer profile is stored in the buyer database 28 in association with the buyer name and the real estate agent name. In the embodiment shown, the agent has entered a profile for eight buyers: Mary Doe, Jennifer Gray, Bob Holmes, Johnny Johnson, Mark and Mary Jones, Chloe Mills, Bob Morris, and John Smith. These names comprise the agent's buyer list. The agent may add further names and profiles at any time.

Upon receiving the log-in name and password from the agent's computer 18, the server 10 examines the name and password to determine if they are valid. If so, the server 10 allows the computer 18 to access the web site 12. In the embodiment shown, the server 10 determines that the user name and password are valid, and allows access to the web site 12.

The server 12 provides a web page to the agent 18 inquiring whether the agent wishes to access a buyer list or whether the agent wishes to access comparative market analysis (CMA) functionality. In embodiments, the server 12 also inquires if the agent 18 would like access to other services via the web site 12. In the embodiment shown, the agent 18 indicates that the agent 18 would like to access the agent's buyer list by activating a designated hyperlink.

On receiving an indication that the agent 18 would like to access the agent's buyer list, the server 10 provides the buyer list to the agent 18 in the form of a buyer information web page. The server 10 does so by accessing the databases 26 having information associated with the agent and the buyers on the agent's buyer list, constructing a buyer information web page according to a pre-stored format, and sending the buyer information web page to the agent 18.

Figure 2A:
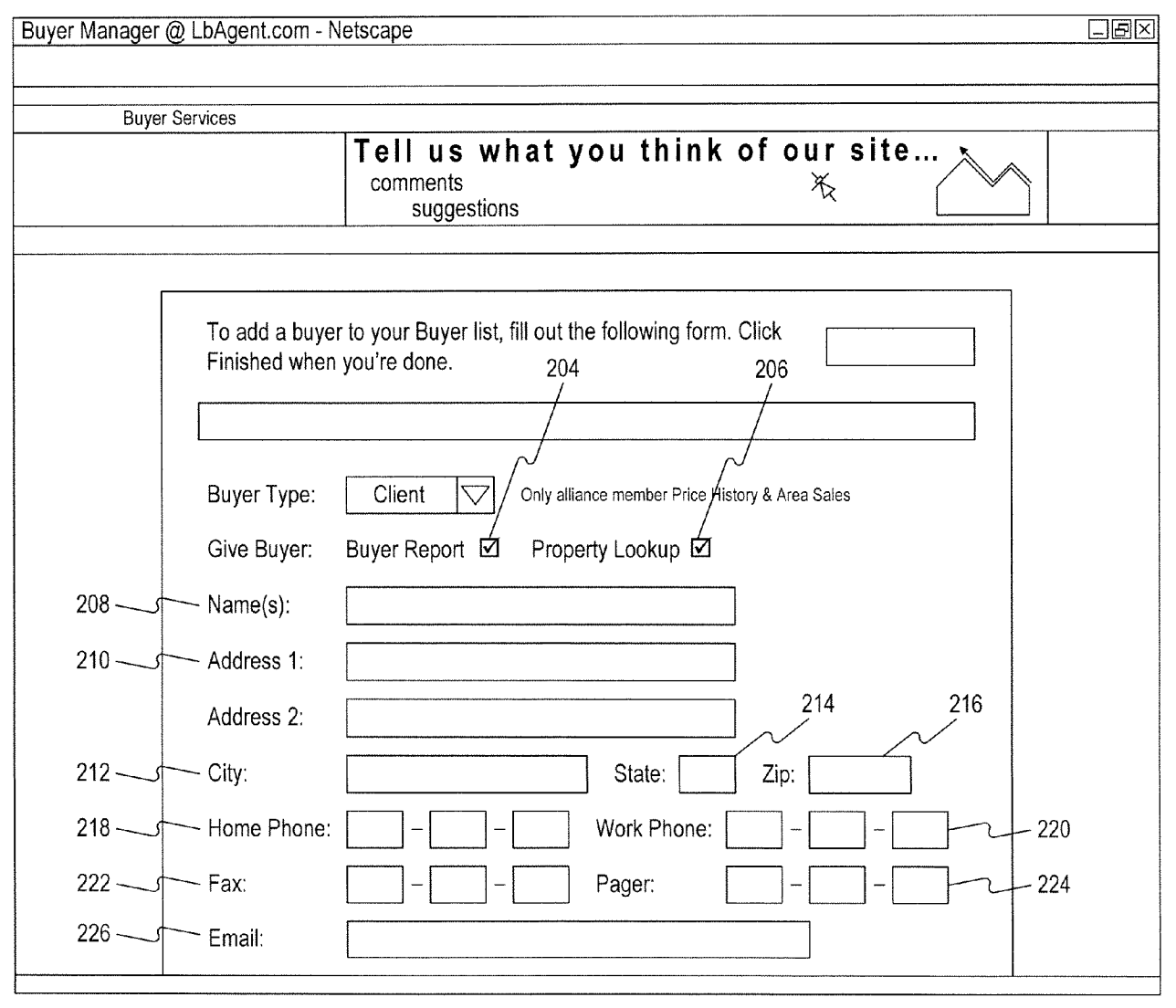

FIG. 2A is an exemplary illustration of adding a buyer, consistent with embodiments of the present invention. An agent may add one or more buyers using the form in FIG. 2A. This Add Buyer form may be used to create or change a buyer account and allows buyer access by filling out a buyer profile form. Agents may add the buyer type 202 and decide whether the buyer receives a Buyer Report 204, or a Property Lookup 206. The agent adds profile information such as the buyer's name 208, address 210, city 212, state 214, zip code 216, home phone number 218, work phone number 220, fax number 222, pager number 224, and an e-mail address 226.

Figure 2B:
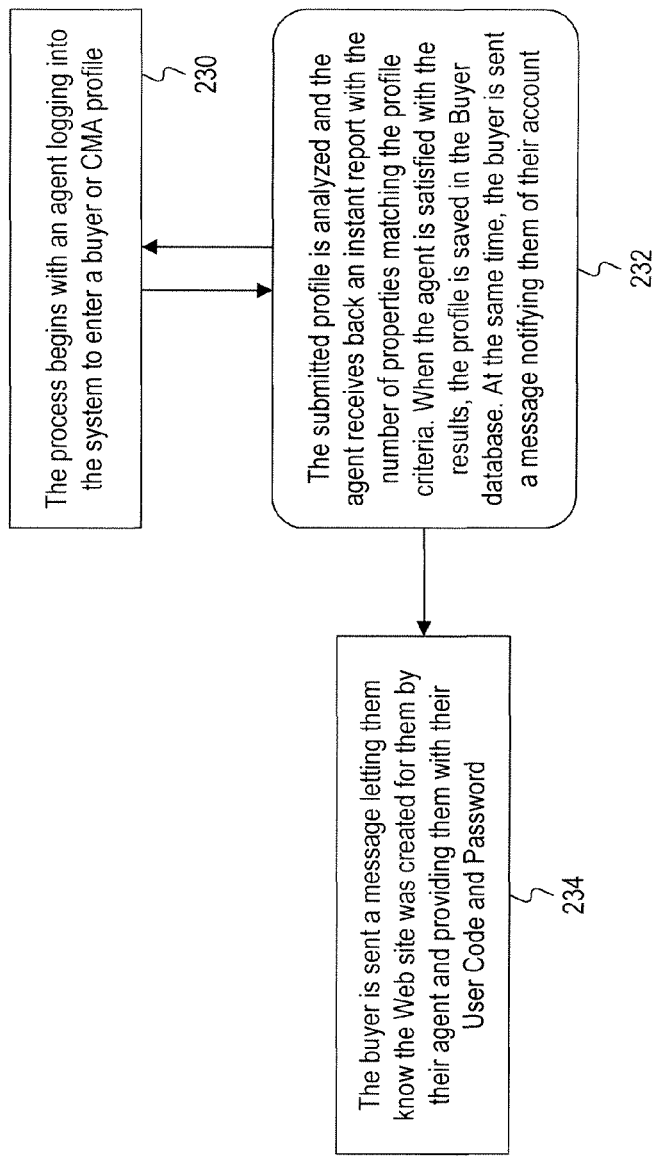
FIG. 2B illustrates an exemplary flowchart of adding a buyer by an agent, consistent with embodiments of the present invention.

FIG. 2B illustrates an exemplary flowchart of adding a buyer by an agent, consistent with embodiments of the present invention. An agent may first login to the system to enter a Buyer profile or alternatively to enter a Seller profile. The submitted profile may then be analyzed. When the agent is satisfied with the results, the buyer profile is saved in the Buyer database 26. The seller profiles are stored in seller database 38. At the time a buyer profile is accepted and saved, the buyer is sent a message notifying them of their account. The system notifies the buyer or buyers that the web site was created for them by their agent and providing them with their respective user code and password (234).

In addition to adding personal information regarding the client (such as name, address, etc.), the agent includes in his clients' profiles important information regarding the buyer or seller's property or desired property. For example, the agent when entering buyer information selects what features of the system the buyer will be able to use. The agent, for example might allow the buyer to use both the Buyer Report and the Property Lookup features. In a preferred embodiment, if the Buyer Report feature is not selected, the buyer can still receive a list of properties that the agent tags. The agent selects the type of properties the buyer is interested in, and the location of the buyer's interest. For instance the agent may enter a MLS area, from a table the system provides to the agent. The agent can add additional areas, or can select certain areas by, for example, sub-divisions or schools. The agent also selects the type of property of interest (e.g. single home, townhouse, condominium, or all) and the size of the home of interest. The present invention preferably includes an advanced areas Wizard that allows the agent to follow a step by step process of selecting sub-divisions, complexes, or school districts, by means of example only. The agent can also select only certain counties as of interest to the buyer. In preferred embodiments, the agent can include more than one geographical selection (e.g. school division and county) so that only properties falling with both selections are listed. The agent also enters the price or price ranges of interest to the buyers. Preferably, the agent will also, from a list of features, identify those features that the buyer must have and those that the buyer would like to have. The invention may include an extensive list of features, such as square footage, number of bedrooms, number of bathrooms, location, and so forth) that can be selected as "must have" or "like to have" features.

Figure 2C:
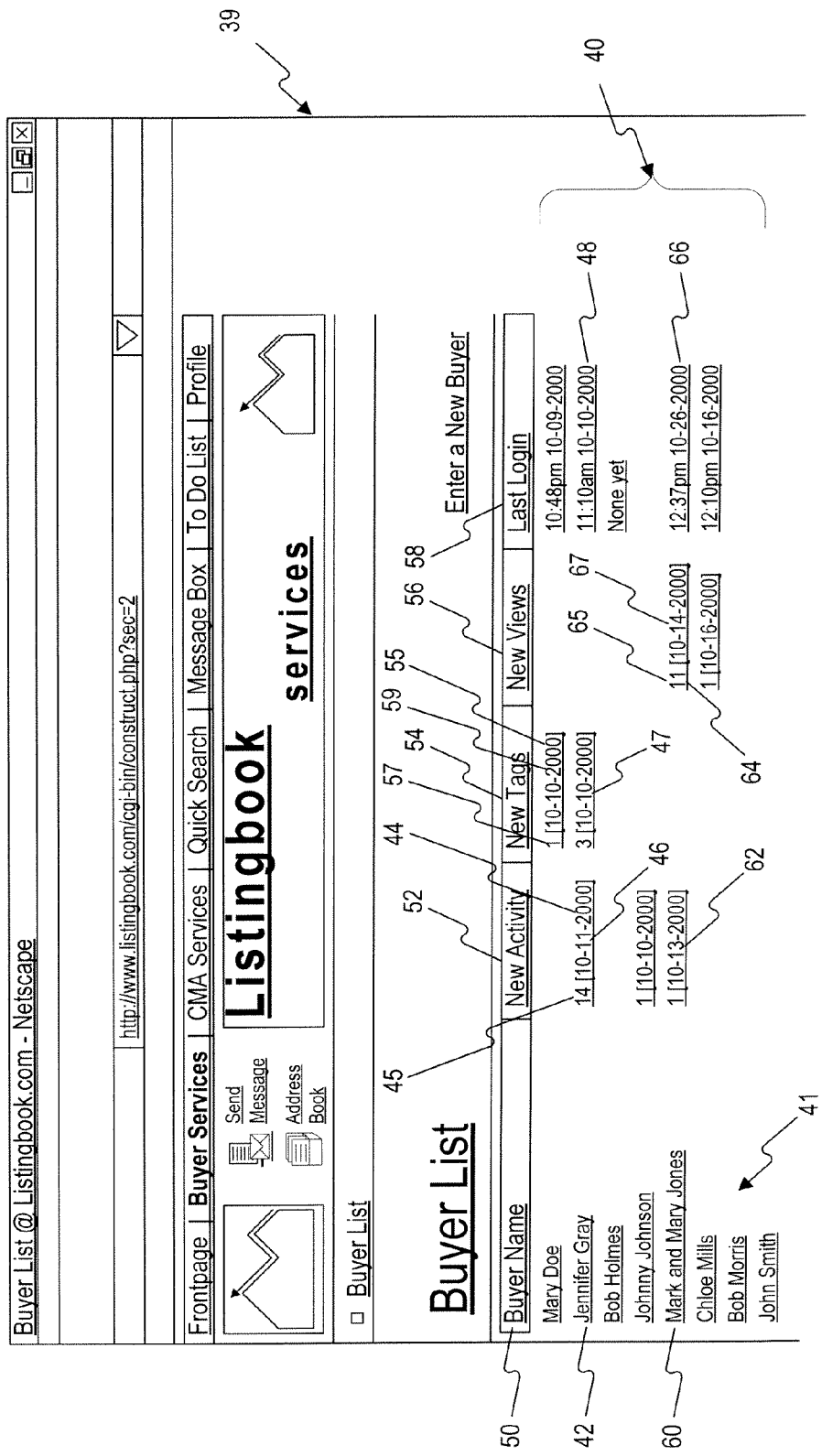
FIG. 2C shows an embodiment of a buyer information (or buyer list) webpage according to the present invention.

After the agent enters clients such as buyers, the agent can then review the list of all of his buyers. A buyer information (or buyer list) webpage 39 is shown in FIG. 2C. The buyer information webpage 39 comprises potential buyer information 40 in summary format. The potential buyer information 40 shown in FIG. 2C comprises a grid of eight potential buyer names 41 (the names entered earlier by the agent) and summary information associated with each of the eight potential buyer names 41. The pre-stored format is stored on the server 10. Database applications and web-page construction applications 14 carry out the accessing of data in the databases 26 and the construction of a web page.

The code for constructing the format comprises code for constructing a grid as shown in FIG. 2C. Moreover, the format provides that the summaries or names in the buyer name column 50, the new activity column 52, the new tags column 54, and the new views column 56 comprise hyperlinks to associated web pages.

Referring to the buyer name of Jennifer Gray as an example in FIG. 2C, the potential buyer information 40 comprises a potential buyer name 42 and a new activity summary 44 associated with the potential buyer name of Jennifer Gray 42. The information 40 also includes a new tags summary 47 associated with the potential buyer name of Jennifer Gray 42, and a last login summary 48 associated with the potential buyer name of Jennifer Gray 42.

As another example, referring to the buyer name of Mark and Mary Jones 60, the potential buyer information 40 comprises a new activity summary 62 associated with the potential buyer name of Mark and Mary Jones 60. The information 40 also includes a new views summary 64 associated with the buyer name of Mark and Mary Jones 60, and a last login summary 66 associated with the potential buyer name of Mark and Mary Jones 60.

Referring again to the Jennifer Gray buyer name 42, the new activity summary 44 comprises a new activity number 45 indicating the number of properties meeting the buyer profile of Jennifer Gray that have been added to the property database 24 since a previous view by the agent of a new activity web page associated with Jennifer Gray. The new activity summary 44 also comprises a date indicating the earliest date that a property meeting the buyer profile associated with the potential buyer name was added to, or changed in, the MLS database or similar database since a previous view of the new activity web page associated with the potential buyer name by the agent. For example, if the agent viewed the new activity web page on Oct. 15, 2000, and eleven property listings were either added to a property database or modified in the property database, the first of which was added on Oct. 20, 2000, the number determined would be eleven and the date determined would be Oct. 20, 2000.

In the embodiment shown in FIG. 2C, the new activity summary 44 associated with Jennifer Gray indicates that fourteen properties that fit the profile of Jennifer Gray have been modified (i.e., added to the database or changed in the database, such as a price change) since the agent's last view of the new activity web page, and that the first date on which such a modification occurred is Oct. 11, 2000. Thus if the agent last viewed the new activity web page associated with Jennifer Gray on Oct. 3, 2000, and fourteen properties have been modified in the property database (e.g., new listings, drop in price, and alterations to price) since October 3, and the first of those modifications occurred on Oct. 11, 2000 (i.e., all fourteen modifications occurred on or after October 11), then the new activity summary 44 of Jennifer Gray would be as shown (14 [Oct. 11, 2000]).

Part of a new activity web page 70 associated with the buyer name of Jennifer Gray is shown in FIG. 3. The agent may view this web page 70 by clicking on (i.e., activating) the new activity summary link 44. The new activity web page 70 comprises a list summarizing properties in the property data database 24 that meets (i.e., falls within) the buyer profile (e.g., price range) associated with the buyer name of Jennifer Gray. In the embodiment shown in FIG. 3, all properties, including all newly-listed or changed properties, that fall within the buyer profile of Jennifer Gray is provided in the web page (or web pages) provided upon activating the new activity summary link 44. In other embodiments, just the newly-listed or changed properties may be shown on the new activity web page.

In another embodiment, the new activity webpage comprises a list of properties meeting the buyer's property type, area, price range, and "Must Have" property features. The system may allow the agent and/or buyer to evaluate each property feature indicating if they 1) Don't care about a feature by leaving it blank; 2) Really want the feature but will consider houses without that feature by indicating it's a "Like to Have" feature; and 3) Won't consider houses unless they have the feature by indicating it's a "Must Have" feature. Properties with all of the buyer's "Like to Have" features in addition to the meeting the type, areas, price range and "Must Have" features requirements are considered "Perfect Matches."

When preparing the buyer information webpage 39, the server 10 constructs the new activity summary 44 by accessing the buyer database 28 which includes the date on which the agent last accessed the new activity webpage associated with Jennifer Gray, and then accessing the property data database 24 to determine the number of properties that meet Jennifer Gray's profile that have been added or changed since that date. The MLS database 22 and the property data database 24 includes a date stamp indicating the date a particular property profile was added or changed. Once such dates for the properties meeting Jennifer Gray's profile and number of new activity (post-web page viewing) listings meeting Jennifer Gray's profile are identified, the server 10 selects the earliest of the dates as the number to place in the new activity summary, and the server 10 places the number and the date in a hyperlink, and provides the summary 44 in the new activity column 52 as shown in FIG. 2C.

When viewing property summaries for a particular buyer name, the agent can "tag" certain properties of interest. For example, when viewing the new activity web page for Jennifer Gray shown in FIG. 3, the agent can click a "Tag" checkbox 72 associated with a particular property. By tagging a particular property, the property is added to a list of tagged properties for Jennifer Gray. The buyer can also tag properties as the buyer reviews available properties. In the embodiment shown, when a buyer "tags" a property, an e-mail alert is sent to the buyer's agent notifying the agent that the buyer has tagged the property. Additionally, when the agent "tags" a property for a buyer, an e-mail alert is sent to the buyer notifying the buyer that the agent has tagged a property.

Buyers may also access the new activity web page and tag properties of interest (sometimes called a "Home Finder Report"). Buyers access the web site 12 via the Internet 16 in a manner similar to the agents' access. For example, Jennifer Gray and other buyers on the buyer list 41 may access the page shown on FIG. 3 (or a similar page) and tag properties of particular interest. The MLS number or other pointer associated with a tagged property is stored in a tags database 30 in association with the buyer name (the tags database 30 is also called the "userstate database").

For example, if Mary Doe or the agent 18 access a property list for Mary Doe and tag a particular property (e.g., a property at 8927 Scotch Heather Way), a MLS number or other pointer is stored by the server 10 in the tags database 30 in association with the buyer name Mary Doe.

Figure 4:
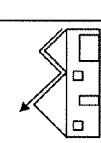
FIG. 4 shows an embodiment of a tagged list web page according to the present invention.

Referring to FIG. 2C, the new tags summary 55 comprises a new tags number 57 indicating the number of properties tagged by Mary Doe using an online property information viewing system accessible by Mary Doe since a previous view of the new tags web page associated with Mary Doe (shown in FIG. 4). When preparing the buyer information web page 39, the server 10 constructs the new tags summary 55 by accessing the buyer database 28 which includes the date on which the agent last accessed the new tags web page associated with Mary Doe, and then accessing the new tags database 24 to determine the number of properties that have been tagged by either the agent or Mary Doe in associated with Mary Doe's profile since that date. The server 10 then determines the date of the earliest-tagged property since the last time the agent examined the new tags web page associated with Mary Doe. Only the properties tagged by the agent when working with Mary Doe's profile are included (i.e., the properties tagged by the agent when working with others' profile are not included). The properties tagged by the agent for other buyers are not included in Mary Doe's list. Once the date of the earliest-tagged property and number of new tags have been determined by the server 10, the server 10 places the number and the date in a hyperlink, and provides the summary 55 in the new tags column 54 as shown in FIG. 2C.

Referring to FIG. 2C, the new tag summary 54 for Mary Doe indicates that one property has been added to the new tags database by the buyer since the last date the agent viewed the new tags web page associated with Mary Doe. The summary 54 also indicates that Oct. 10, 2000, was the date on which Mary Doe tagged the property. The October 10 date is the date of the earliest changed information after the last view of the web page.

As another example, the summary associated with Jennifer Gray 47 indicates that three new tags have been added to the new tags database 30 by the buyer since the last date on which the buyer viewed the new tags web page associated with Jennifer Gray (assume the last date on which the buyer viewed the new tags web page associated with Jennifer Gray was Oct. 5, 2000). The summary 47 also indicates that the first of the three new tags added by the buyer was added to the new tags database 30 on Oct. 10, 2000.

A new tags web page 80 is shown in FIG. 4. The new tags web page 80 shown is for Mary Doe, and is the page reached when clicking on the new tags hyperlink 55. The new tags web page 80 is constructed by the server 10. To do so, the server 10 accesses the tags database 30 to determine the MLS number(s) or other pointer(s) indicating the properties tagged for Mary Doe by Mary Doe or the real estate agent. Once these pointers are determined, the pointers are used to obtain information from the property data database 24 regarding each property indicated by the pointer(s). Once this information is obtained, the information is formatted as shown in FIG. 4 and provided to the requesting client computer, e.g., the agent 18. The client/customer 20 is provided access to an online property information system by the server 10 via the Internet 10. The information system is provided in the web site 12 residing on the server 10. The agent 18 provides the client/customer 20 access to the web site 12 by creating a profile for the client/customer, and the server 10 assigns a user (i.e., buyer) name to the client/customer 20. This user name, along with an associated password assigned by the server 10, is provided to the client/customer 20, preferably by e-mail from the server 10.

The client/customer 20, e.g., Mark and Mary Jones, logs into the web site 12 using the user name and password provided by the server 10. The web site 12 provides various features to the client/customer 20. The agent 18 may choose to provide or not to provide certain ones of various features offered by the web site 12 to the client/customer 20, depending for example on the agent's relationship with the client/customer 20.

Figure 5:
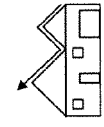
FIG. 5 shows an embodiment of a buyers search results web page according to the present invention.

One feature to which the agent may provide access to the client/customer 20 is the home finder search feature within the online property information viewing system 11. As discussed above, the agent enters a profile search criteria for the buyer, and the buyer is presented with properties from the property database 24 that meet this criteria. The buyer 20 may also be given access to a second aspect of the property information viewing system 11. In the second aspect, the client/customer (buyer) 20 is provided a search page in the web site 12 comprising form fields in which the client/customer 20 may enter search criteria (e.g., price range, geographic location, minimum number of bedrooms, minimum number of bathrooms, and minimum square footage). The criteria is provided to the online system 11 which conducts a search of the properties in the property data database 24. The online system 11 constructs a summary web page of the properties meeting the search criteria and provides the web page to the client/customer 20. An example of such a search results page 90 is shown in FIG. 5.

The client/customer 20 may then select one or more properties in the search results list for examination of further details regarding that property. For example, Mark and Mary Jones may activate (e.g., click on) the hyperlink 94 associated with 5908 Carriage Oaks Drive to examine further details regarding that property. When Mark and Mary Jones activates the hyperlink 94, two activities take place. First, the online system 11 accesses data in the property data database 24 associated with 5908 Carriage Oaks Drive, formats the data into the web page 96 shown in FIG. 6, and provides the web page to Mark and Mary Jones at their client computer 20 via the Internet. Second, the online system 11 records Mark and Mary Jones's view of the details of the Carriage Oaks property in the views database 30. For example, the MLS number of the Carriage Oaks Drive property is recorded as a "new view" in the views database 30 in association with the Mark and Mary Jones buyer name. Referring to FIG. 5, the Mark and Mary Jones buyer also clicks on the 9740 Faires Farm Road hyperlink 96 and views the details of the Faire Farm Road property. The online system 11 also records this "new view" in the new view database 32. The "new views" in the embodiment discussed reflects a view by the customer/client of the details of a particular property. A viewing of summary data, as shown in FIG. 5, is not recorded in the new views database, but a viewing of the details associated with a property, as shown in FIG. 6, is recorded as a new view.

Also shown in FIG. 6 is an example of tagging. In FIG. 6, Mark and Mary Jones have "tagged" the property at 5908 Carriage Oaks Drive by clicking the check-box 92 associated with the property.

Referring again to FIG. 2C, when the server is creating the web page 39, the server creates a new views summary for each buyer in the buyer list for which there are new views. For example, the Mark and Mary Jones user has carried out new views not viewed by the agent, and a new views summary 64 is created for Mark and Mark Jones. The new views summary 64 comprises a new views number 65 indicating the number of properties viewed by Mark and Mary Jones using the online information system since a previous view of the new views web page 98 associated with Mark and Mary Jones (shown in FIG. 7).

Figure 6A:
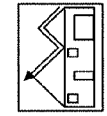
FIG. 6A illustrates an exemplary property detail page, consistent with embodiments of the present invention.

FIG. 6A illustrates a portion of an exemplary property detail page, consistent with embodiments of the present invention. In addition to the normal property information such as listing details, property photos and a map showing the location of the property, the system may provide additional reports including an area sales 602 report and loan report 604. An area sales report 602 automatically finds sold properties in the area around the property being viewed, without requiring the user to define search criteria. The area sales 602 may provide an idea of the price range of the surrounding properties and may also show re-sales of neighboring properties providing an indication of area price appreciation. Loan report 604 may estimate principal, interest, taxes, and insurance (PITI) for the property being viewed. It may also provide taxes and insurance, and other expense estimates.

Figure 6B:
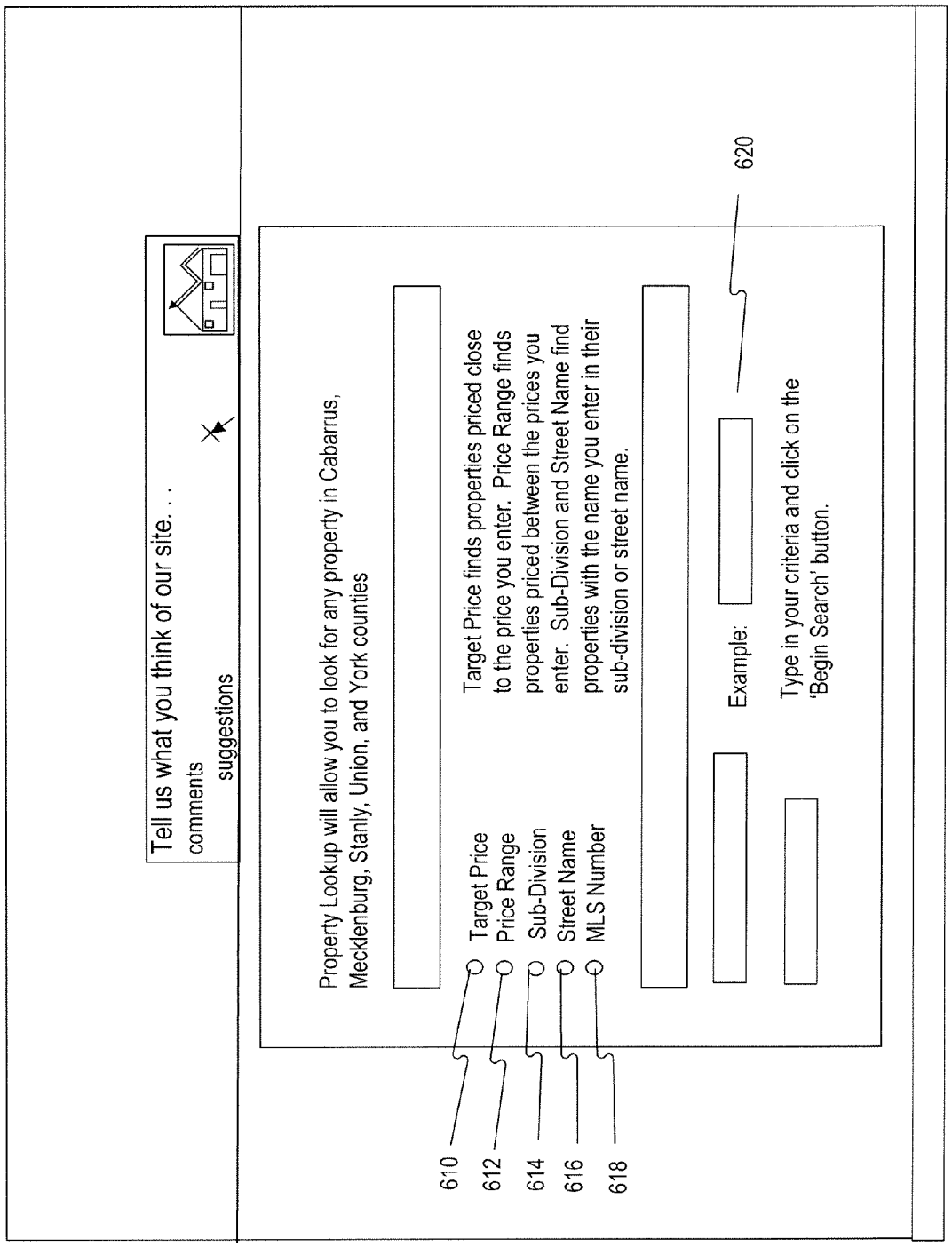
FIG. 6B illustrates an exemplary webpage allowing a buyer to obtain information about a particular property, consistent with embodiments of the present invention.

FIG. 6B illustrates an exemplary webpage allowing a buyer to enter search criteria and conduct a search for properties, consistent with embodiments of the present invention. To initiate a search, the buyer enters search criteria by, for example, choosing between Target Price 610, Price Range 612, Sub-Division 614, Street Name 616 and MLS Number 618.

Target price 610 finds properties closest to the price the buyer enters in search box 620. Buyers may enter the appropriate price of the property they want to locate and the system automatically creates a range that locates properties that are close to that price. A buyer may use the Property Lookup to see how much of a house they can buy, i.e., comparably priced properties. Price Range 612 finds properties priced between the prices the user enters in search box 620. Sub-Division 614 and Street Name 616 find properties with the Sub-Division name or Street Name the user enters, and the MLS Number 618 finds the property with the corresponding MLS number.

Figure 6C:
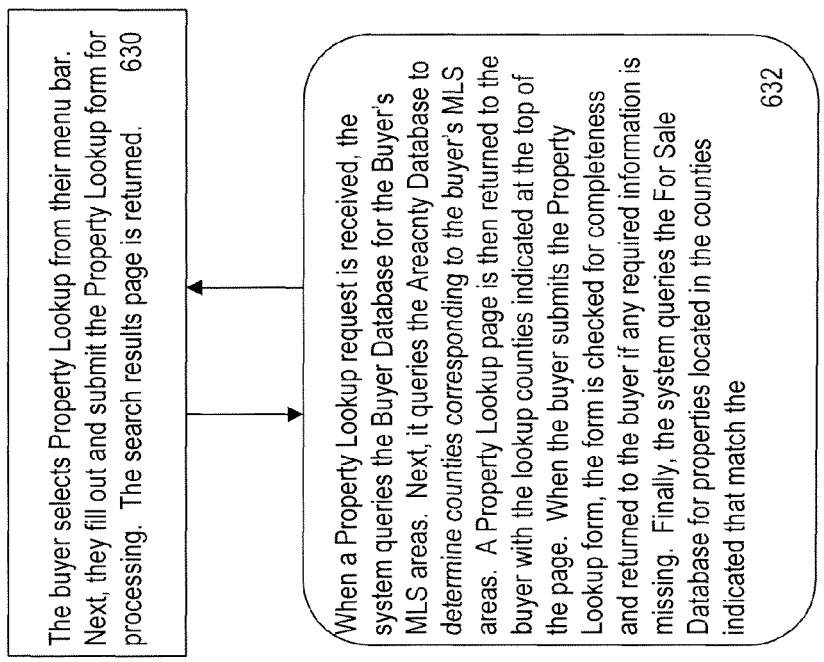
FIG. 6C illustrates a flowchart of an exemplary property search relating to FIG. 6B, consistent with embodiments of the present invention.

FIG. 6C illustrates a flowchart of an exemplary property search relating to FIG. 6B. A buyer may first select Property Lookup from the menu bar. When a Property Lookup request is received, the system queries the buyer database 28 for the buyer's MLS areas. Next it may query the MLS database 22 to determine counties corresponding to the buyer's MLS areas. A Property Lookup page, like that shown in FIG. 6B, is then returned to the buyer with the lookup counties indicated at the top of the page. When the buyer submits the Property Lookup form, the form is checked for completeness and returned to the buyer if any required information is missing. When the required information is submitted, the system queries the for-sale database 24 for properties located in the counties indicated that match the query and provide the results to the buyer. The buyer can perform various searches and then review the results of the search. In a preferred embodiment, the Property Lookup feature is also available to agent's sellers, as well as to the agent.

In addition to tagging properties in the buyer report generated in response to criteria entered by the agent on the buyer's behalf, a buyer can tag properties he finds using the Property Lookup feature. The properties a buyer tags will be added to the tagged list, and the buyer's agent will be automatically notified regarding the tagged properties, as explained above. The tagged property is stored in tags database 30. The method and systems of the invention preferably use highlighting or other indication to distinguish the tagging of properties by the agent from the tagging of properties by the buyer.

When preparing the buyer information web page 39, the server 10 constructs the new views summary 64 by accessing the buyer database 28 to determine the date on which the agent last accessed the new views web page associated with Mark and Mary Jones, and determining the date of the earliest of the new views that occurred after the agent last accessed the new views web page associated with Mark and Mary Jones. The server then accesses the new views database 32 to determine the number of properties that have been viewed by Mark and Mary Jones in association with Mark and Mary Jones' profile since the date of the last access of the new views web page. Once this date and number of new views have been determined by the server 10, the server 10 places the number and the date in a hyperlink, and provides the summary 64 in the new views column 56 as shown in FIG. 2C. In the new views summary 64, it is shown that eleven properties have been viewed by Mark and Mary Jones since the last date on which the agent viewed the new views web page. The earliest new view that occurred after the date of the last date on which the agent last viewed the new views web page is Oct. 14, 2000.

Figure 7:
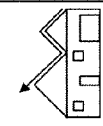
FIG. 7 shows an embodiment of a viewed list web page according to the present invention.

A new views web page 98 for Mark and Mary Jones is shown in FIG. 7. The page is reached when clicking on the new views hyperlink 64 associated with Mark and Mary Jones. The new views web page 98 is constructed by the server 10. To do so, the server 10 accesses the views database 32 to determine the MLS number(s) or other pointer(s) indicating the properties viewed by Mark and Mary Jones. Once these pointers are determined, the pointers are used to obtain information from the property data database 24 regarding each property indicated by the pointer(s). Once this information is obtained, the information is formatted as shown in FIG. 7 and provided to the requesting computer, e.g., the agent 18.

Referring to FIG. 7, note that the 9740 Faires Farm Road property is shown as viewed 100. The Carriage Oaks Drive property is below the Faires Farm Road property on the list shown in FIG. 7 and is thus not shown. The new views list partially shown in FIG. 7 includes thirty properties. The thirty properties comprise all the properties viewed by Mark and Mary Jones using the server's system. The eleven properties viewed by the Mark and Mary Jones since the agent's last view of the new views web page are shown at the top of the list. In an embodiment, the eleven new views are highlighted as well.

In all web pages shown, when a property address is shown as underlined, it comprises a hyperlink. When the hyperlink is activated, the details of the property are provided to the user, similar to that which is shown in FIG. 6.

The web page 39 shown in FIG. 2C also includes a last login summary for each buyer on the buyer list. The last login summary is shown in the last login column 58. The last login summary is associated with a potential buyer name, and comprises a date indicating the last time the person associated with the potential buyer name used the online property information system provided by the server. For example, the last login summary for Jennifer Gray 48 indicates that the last time and date that Jennifer Gray logged into the online property information system provided by the server was 11:10 am on Oct. 10, 2000. The last login summary for Mark and Mary Jones 66 indicates that the last login for Mark and Mary Jones was 12:37 pm on Oct. 26, 2000. If the person associated with the buyer name has not yet logged in, the last login summary indicates "Not yet," and if the buyer has not yet been given access to the online property information system, the login summary gives an indication, such as "- -," "Not Provided Access," or some other indicator.

The server determines the data used in the last login summary by accessing the buyer database 26. When a buyer logs in, the date and time is stored along with the buyer name, and the server 10 retrieves this information in constructing the last login summary.

As shown in FIG. 2C, and as described above, the buyer information web page 39 comprises a grid—a group of rows and columns. Each row is associated with a particular buyer name. The buyer names comprise hyperlinks that link to an options menu page for each buyer that links to reports and services for each buyer, or that links to other information about the buyer. The columns comprise a new activity column 52 which shows the new activity summary for each buyer, a new tags column 54 comprising the new tag summaries for each buyer, a new views column 56 comprising the new views summary for each buyer, and a last login column 58 comprising the last login summary for each buyer. Each of the summaries comprises a hyperlink that links to an associated web page.

Figure 8:
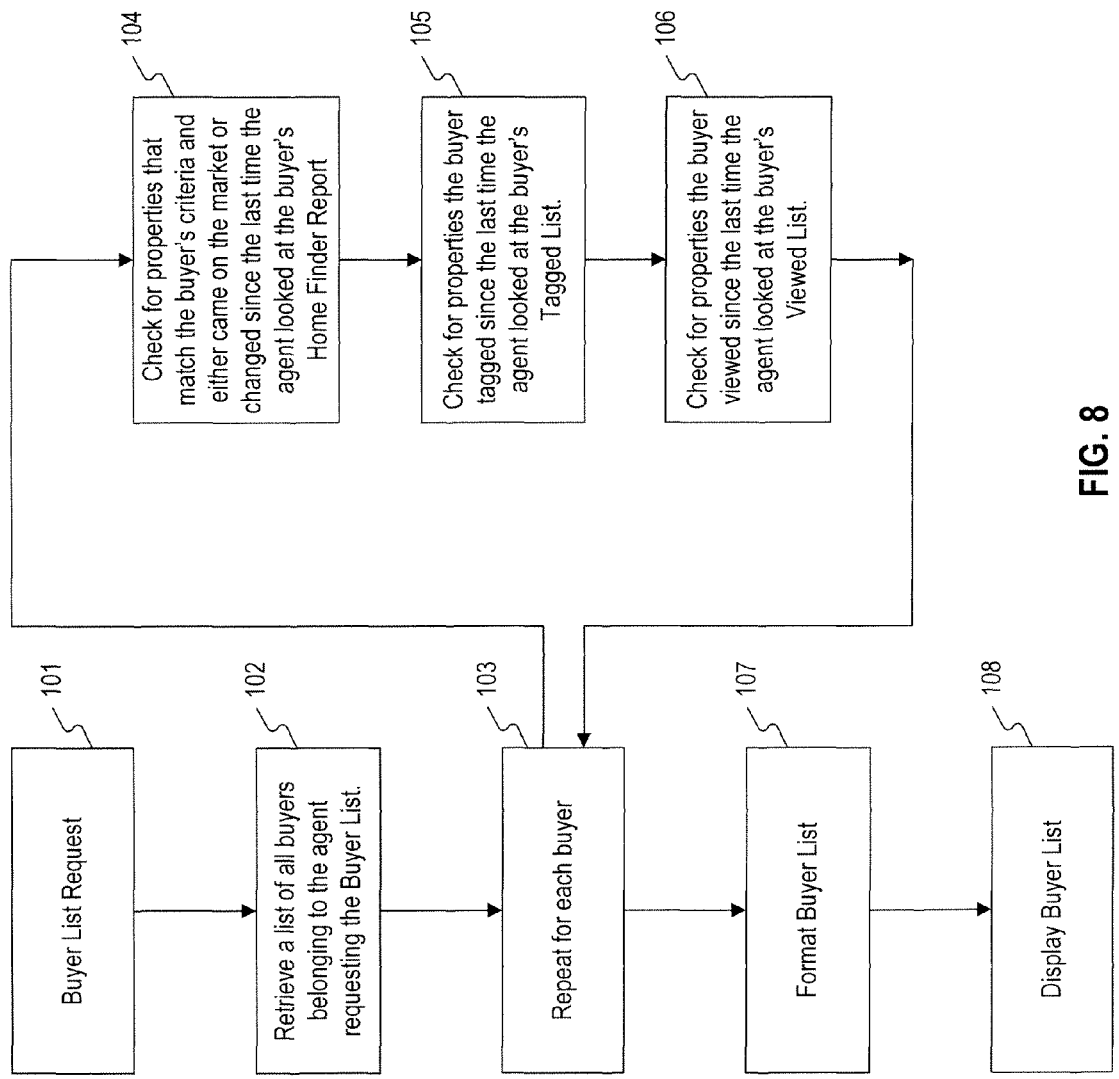
FIG. 8 shows a flow diagram comprising an embodiment of steps used to provide a buyer list web page according to the present invention.

FIG. 8 shows a simplified flow diagram of some of the steps according to the present invention described above. The processor/server receives a request for a buyer list from an agent 101. The server 10 retrieves a list of all buyers associated with the agent requesting the buyer list from the buyer database 102. The server 10 then carries out the steps shown in items 104-106 for each of the buyers in the retrieved buyer list.

First, the server 10 checks the property data database for properties that match the first buyer's criteria and that either came on the market or changed since the last time the agent examined the buyer's home finder report (a summary list of properties meeting the buyer's criteria) 104. Second, the server checks for properties that the first buyer tagged since the last time the agent examined the first buyer's Tagged List (a summary list of properties tagged as being of particular interest by the buyer or the agent) 105. The server checks the tags database 30 for such properties, which is the database in which at least a pointer to tagged properties is stored. Third, the server checks for properties the first buyer viewed since the last time the agent examined the buyer's Viewed List (a summary list of properties for which the buyer viewed a detailed information web page).

The server then repeats these steps 104, 105, 106 for each buyer in the list of buyers associated with the agent. Once the steps have been completed for each buyer, the server formats the buyer list web page (e.g., as shown in FIG. 2C) 107 and provides the web page to the agent's browser for display 108.

Embodiments of the present invention may offer seller functionality as well. Referring again to FIG. 1, after the agent 18 logs into the web site 12, the web site 12 receives an indication (e.g., by a hyperlink) that the agent 18 would like to access the agent's CMA list. Upon receiving the indication, the server 10 provides a list web page showing subject property information to the agent 18.

Figure 9:
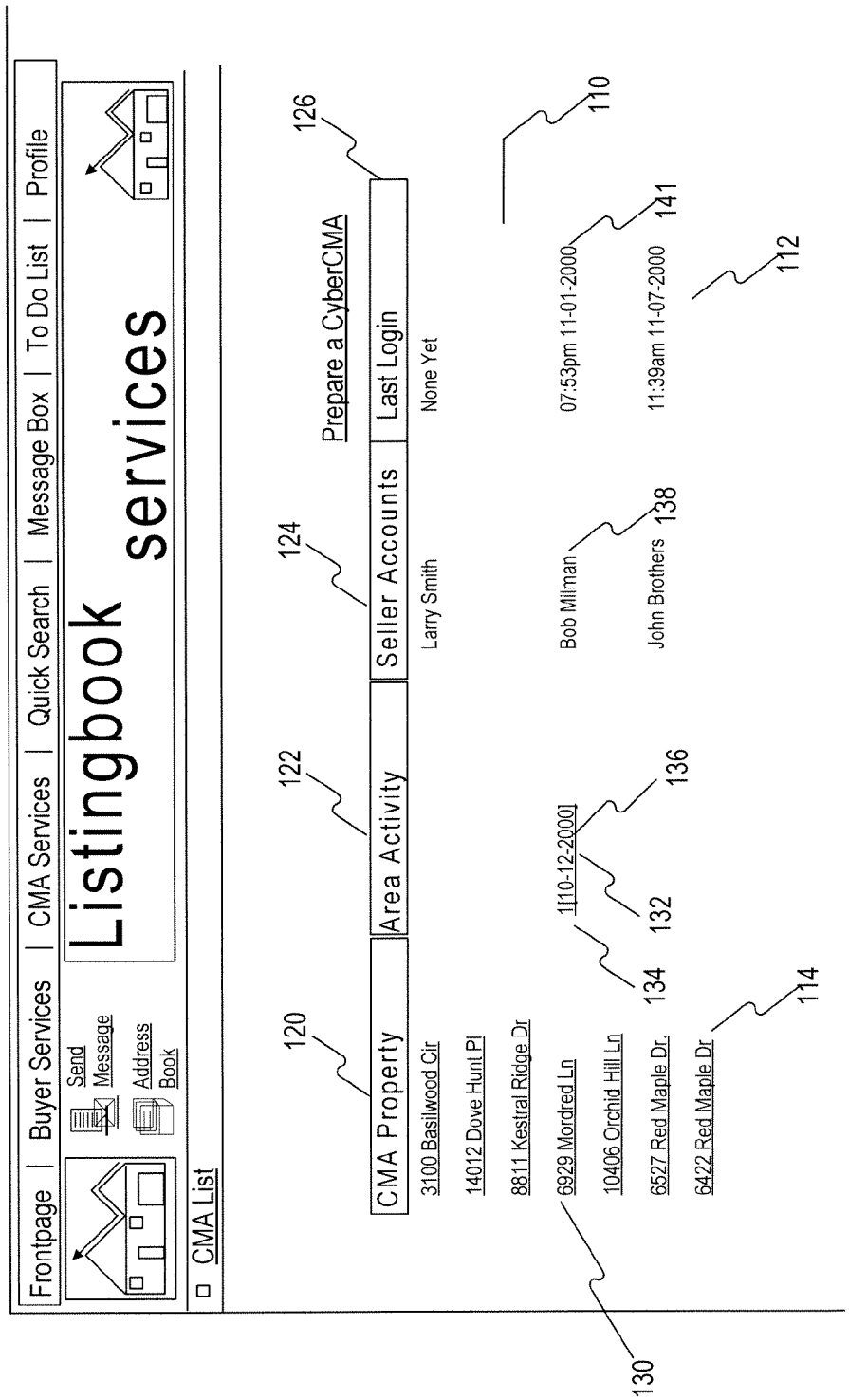
FIG. 9 shows an embodiment of a CMA list web page according to the present invention.

An embodiment of a CMA list web page 110 is shown in FIG. 9. The web page 110 provides summary information useful to a real estate agent in listing a property for-sale. The web page 110 includes a list of properties of interest to the agent (called "subject properties") 114.

The real estate agent has previously identified to the web site 12 the subject properties. For example, in an embodiment, the real estate agent identifies the subject properties by filling out a property description form, selecting properties of interest from a list or properties, indicating the MLS number in a form field provided by the web site, or by other means. For example, referring to the list of subject properties 114 in FIG. 9, the real estate agent 18 has previously indicated the seven property addresses shown as subject properties. A pointer to each of the subject properties is stored in the CMA Property database 39 in the CMA Services database 38. The pointers are stored in association with the real estate agent's user name for retrieval.

Referring to FIG. 9, the CMA list web page 110 comprises subject property information 112 comprising property identifiers for each of the subject properties 114 and an area activity summary associated with each of the property identifiers (e.g., the summary shown as "1 [Oct. 12, 2000]" 132 associated with the Mordred Lane property). The embodiment shown of the CMA list web page 110 in FIG. 9 also includes a seller accounts summary associated with each of the property identifiers (e.g., the summary shown as "Bob Milman" 138 associated with the Mordred Lane property), and a last login summary (e.g., the summary shown as associated with the property identifier for the Mordred Lane property 140 in FIG. 10).

The server 10 creates the CMA list web page 110 provided to the agent 18 by accessing the appropriate databases and placing the pre-designated data in a template in the form shown in FIG. 9.

When preparing the CMA list web page 110, the server 10 accesses the CMA property database 39 to determine all of the CMA properties designated by the logged-in agent. The property identifiers for each of these properties is placed in the CMA property column 120 as shown in FIG. 9.

Also, when preparing the CMA list web page 39, the server 10 constructs the area activity summary 132. The area activity summary comprises a new area activity number (e.g., item 134) indicating the number of properties in a pre-defined area undergoing a pre-defined event (e.g., an addition to the property database or a change in status, such as a sale, drop in price, or other change within a pre-defined time period) since a previous view of a new area activity web page associated with a property identifier.

The server constructs the area activity summary 132 by accessing the CMA Property database 39 which includes the date on which the agent last accessed the area activity web page associated with 6929 Mordred Lane, and then by accessing the property data database 24 to determine the number of properties that fall within a pre-designated area and predesignated criteria that have been added to the database 24, or that have changed, since that date. The MLS database 22 and the property data database 24 includes a date stamp indicating the date a particular property profile was added or changed, and includes geographic, neighborhood, and other area information. The earliest of these data stamps that occurred after the last access of the area activity web page is used as the date for the summary hyperlink. Once this date and number of new area activity listings are determined, the server 10 places the number 134 and the date 136 in a hyperlink, and provides the summary 132 in the new area activity column 122 as shown in FIG. 9. For example, since the agent last viewed the area activity web page associated with the Mordred Lane property on October 5, one new property has been added to the database 24 (or changed in the database) that is in the Mordred Lane area and fits the pre-defined property profile, and that property was added on Oct. 12, 2000.

That is, the summary 132 indicates that one property meeting the pre-defined area and criteria has been added to the property database 24 since the agent last viewed the new area activity web page. It should be noted that this addition is the only activity occurring with the area in the last thirty days. The date (Oct. 12, 2000) indicates the date the property was added to the database since it is the only property. If it were not the only property, the earliest addition or change date of the properties would be shown. The date 136 indicating the date of the previous view of the new area activity web page associated with the Mordred Lane property is shown as "Oct. 12, 2000," but may be in any format.

Figure 10:
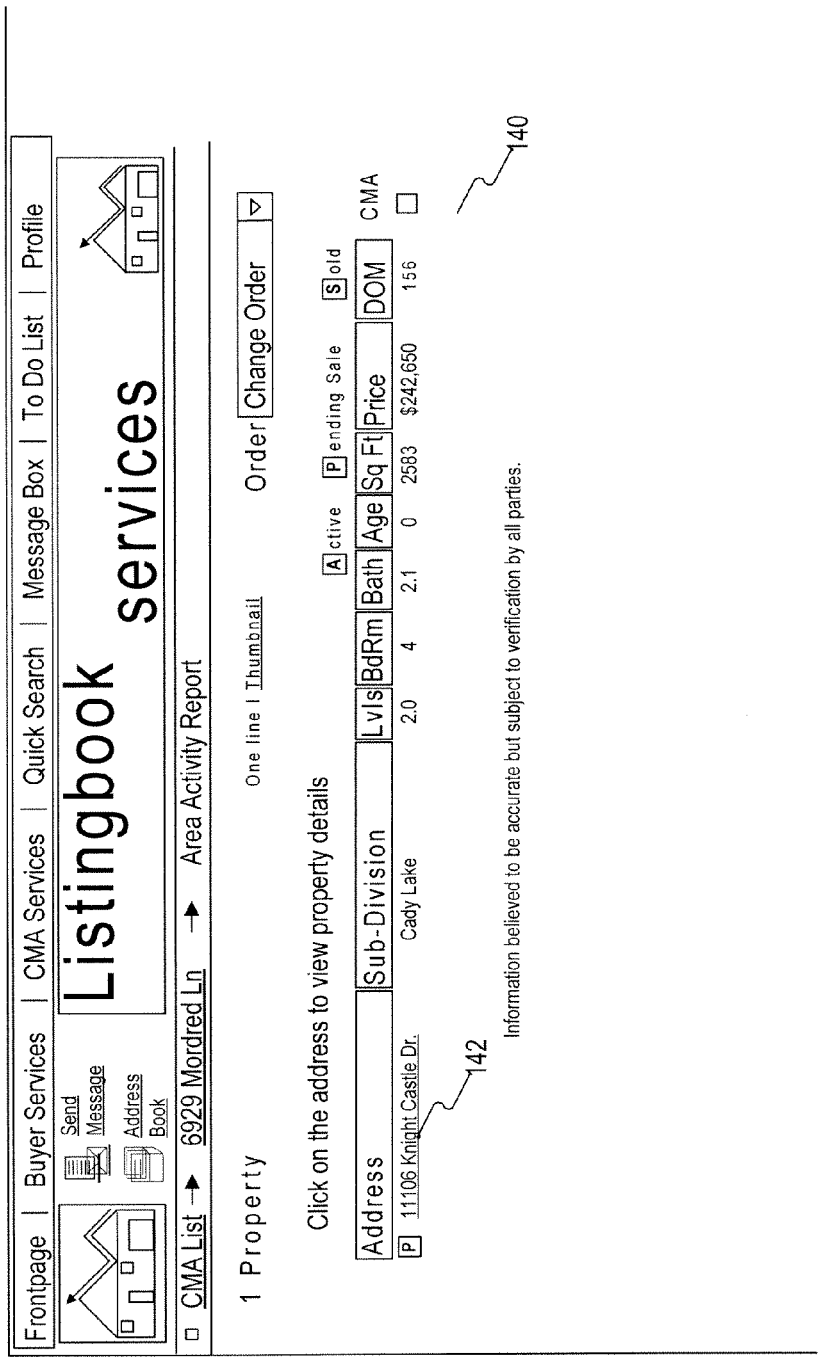
FIG. 10 shows an embodiment of an area activity web page according to the present invention.

The new area activity summary comprises a hyperlink that, when activated, causes the server 10 to construct a new activity web page and to send the web page to the agent 18. An example of a new area activity web page is shown in FIG. 10. The new area activity web page 140 provides a summary of new activity in a pre-designated area around the property of interest, i.e., the Mordred Lane property.

Referring to FIG. 10, an area activity web page 140 is shown for the Mordred Lane property. The web page 140 shows one property 142 for the Mordred Lane property in the property data database 24. Note that this property 142 is the one "new" (i.e., post-Oct. 12, 2000) property noted in the area activity summary 132 shown in FIG. 9. If there were other properties in the database 24, they would be listed on the new activity web page 140 as well. In the embodiment shown, the new properties are listed at the top of the list in the new activity web page 140. In other embodiments, the new properties are highlighted using background color, background graphics, an icon, or other highlighting.

The server creates the area activity web page by accessing the property data database 24 and retrieving summary information regarding each property in the database in a pre-defined area (e.g., street, neighborhood, area defined by an algorithm, or other definition) undergoing a pre-defined event (e.g., an addition to the property database or a change in status, such as a sale, drop in price, or other change). The property data found is formatted as shown in FIG. 10. All of the properties that fit the profile are summarized on the area activity web page, and those properties that have undergone a pre-defined event since a previous view of the new area activity web page associated with a property identifier by the agent are listed at the top.

In other embodiments, the area activity summary and the area activity page comprises properties meeting pre-defined criteria, such as price range, geographic area, builder, number of bedrooms, and square footage. That is, the area activity inquiry may include many factors.

The CMA list web page 110 also includes a seller accounts summary 138 associated with the Mordred Lane property identifier 130. In the embodiment shown, the seller accounts summary comprises the name of the owner of the property if the owner has signed up for a service offered by the web site 10 for sellers and the designation "- -" if the seller has not.

The seller accounts summary is constructed for each property identifier in the list 114 by accessing the seller accounts database 37 to determine if a seller associated with the CMA list property has been given access to the web site 12. The seller accounts database 37 comprises the profiles of registered sellers, including their property identifier, as entered by the real estate agent 18. For example, the server 10 accesses the seller accounts database 37 and finds that the seller name associated with the Mordred Lane property is "Bob Milman," and the name "Bob Milman" is used as the seller account summary 138 associated with the Mordred Lane property.

Similarly, the CMA list web page 110 comprises a last login summary for each listed property. For example, the last login summary for the Mordred Lane property comprises "07:53 pm Nov. 1, 2000" 141. This summary indicates that last time and date that the seller associated with the subject property logged into a service offered by the web site 10. For example, the last login summary mentioned 141 indicates that Bob Milman, the owner associated with the Mordred Lane property, last logged into the service offered by the web site 10 to sellers was 7:52 pm on Nov. 1, 2000. The server 10 constructs the last login summary by accessing the seller accounts database 37, which includes seller profiles and the date and time the seller last logged into a service offered by the web site 10.

In the embodiment shown, the CMA list web page 110 is formatted as a grid. The page 110 comprises a property column 120 in which the property identifiers for the subject properties 114 are listed and an area activity column 122 comprising the new area activity summaries (e.g., the summary for the Mordred Lane property 132). The grid also includes a seller accounts column 124 having the seller account summaries for the subject properties 114, and a last login column 126 having the last login summaries associated with the seller accounts.

Each of the underlined summaries in the CMA property list column 120 and the area activity column 122 comprises a hyperlink. The hyperlinks in the CMA property list column 120 are linked to a menu options page that provides links to various other services for a particular property. The hyperlinks in the area activity column 122 are linked to the new area activity pages associated with the subject property.

Figure 11:
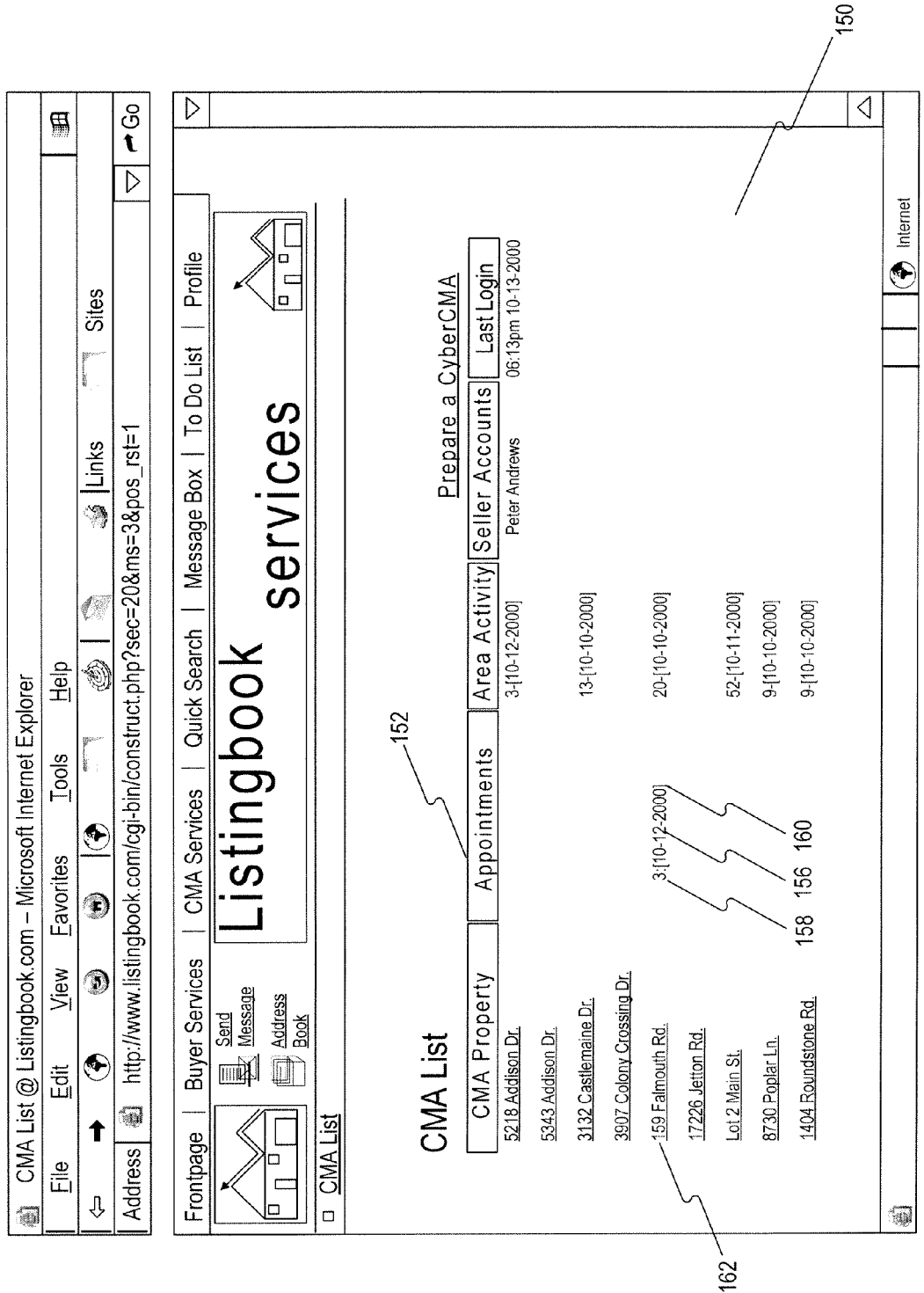
FIG. 11 shows another embodiment of a CMA list web page according to the present invention.

FIG. 11 shows a preferred embodiment of a CMA list web page. In the embodiment shown in FIG. 11, in addition to the material discussed in relation to FIG. 9, the CMA list web page 150 comprises an appointments column 152 that includes a new appointments summary associated with a property identifier. The page 150 shown in FIG. 11 comprises a new appointments summary 156 associated with the 159 Falmouth Road property identifier 162. The new appointments summary indicates the number of appointments (three) 158 carried out in relation to the property associated with the property since the last time the agent 18 viewed a new appointments web page associated with the property (Oct. 12, 2000). The summary 156 indicates that three appointments have been added to an appointments database 35 since the last date the agent viewed a list of appointments online. The date (Oct. 12, 2000) indicates the earliest of the three appointments in the database. In other words, October 12 reflects the earliest appointment added to the database since the agent's last view of the appointments web page.

The appointments database 35 is in communication with an appointments system that receives notification of visits to a listed property, whether receiving through manually entering appointments, communication from an electronic key box or through e-mail or other electronic communication. The received appointments, and associated data (e.g., name of showing agent, date and time of visit, and comments of the potential purchaser(s)) is recorded in the appointments database 35. Also recorded in the appointments database is the last date and time which the agent viewed a web page listing the appointments carried out in relation to the property. In an embodiment, when the server 10 receives notice of a new appointment from the appointments system 36, in addition to recording the information regarding the appointments in the appointments database 35, the server 10 sends an e-mail to the listing agent.

The server 10 examines the data in the appointments database 35 in constructing the appointments summary. The server 10 examines the CMA property database 39 to determine the last date the agent viewed the appointments web page offered on the web site 10 and to determine the number of appointments carried out since that date. The appointments web page comprises a web page linked to the appointments summary 156 that shows data from the appointments database 35 describing the various appointments carried out in relation to the subject property. For example, the appointments summary hyperlink 156 associated with the Falmouth Road property links to an appointments web page describing various aspects of appointments kept by potential buyers to view the Falmouth Road property, such as date, time, showing agent, and comments by showing agent. The appointments web page is constructed using data from the appointments database 35. Like the previous web pages discussed, the new appointments (those occurring after the last time the web page was viewed by the agent) are listed first and highlighted, and the others are listed below the new appointments.

FIGS. 12-16 show database tables used in an embodiment of the buyer list aspect of an embodiment of the present invention as shown in FIG. 1. Each of the tables in FIGS. 12-16 shows a column name (or data field name), type of data in the column, length of the data in the column, and a brief description of the data in the column. Referring to FIG. 1 and the database tables shown, FIG. 12 shows a database table in the buyer database 28. The table includes information about the buyers associated with an agent. FIG. 13 shows a database table also in the buyer database 28. The table includes profile information about buyers. FIG. 14 shows a database table in the views database 32 which includes information on full-information views carried out by buyers. FIG. 15 shows a database table in the tags database 30, including pointers to properties tagged by buyers.

FIGS. 16A and 16B comprise a data table in the property data database 24. The data fields shown comprise data obtained from the MLS database 22 by the server 10 and stored in the property data database 24. FIG. 16B continues the table shown in FIG. 16A.

FIGS. 17-19B similarly comprise data tables associated with the CMA features of an embodiment of the system shown in FIG. 1. Like the tables of FIGS. 12-16, a column name (or data field name), data type, and data length are shown. In addition, a brief note about a some of the column names are made in relation to columns that are not immediately apparent from similar fields in FIGS. 12-16, or in context, or for which a brief description is helpful. FIG. 17 shows a data table of data located in the seller accounts database 37. The table comprises profile information about a seller, including a pointer to the CMA property profile associated with the seller. FIG. 18 shows a data table located in the CMA Property database 39. The table comprises information about the CMA property, including its identification and the date the associated agent last viewed the area activity web page associated with the property. FIGS. 19A and 19B comprise a data table found in the property data database 24 which is used in carrying out the CMA functions. FIG. 19B continues the table shown in FIG. 19A.

Figure 20:
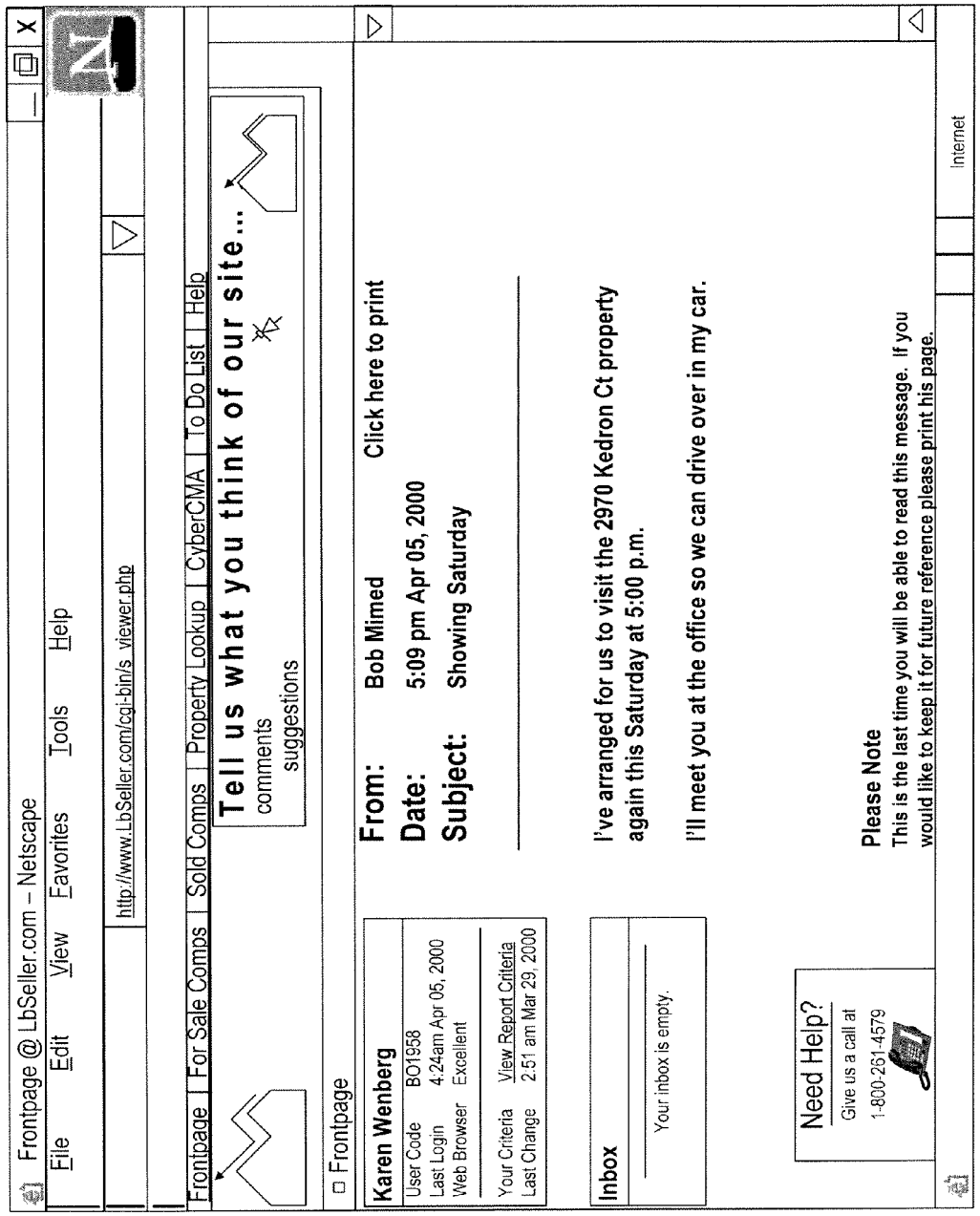
FIG. 20 illustrates an example of integrated messaging, consistent with an embodiment of the present invention.

FIG. 20 illustrates an example of integrated messaging, consistent with an embodiment of the present invention. Clients/Customers may communicate electronically with their agents anywhere, anytime without the use of an email account. Buyers and sellers are notified of new messages by a blinking envelope at the end of a menu bar (not pictured). In one embodiment, the subject line of the message is automatically filled. For example, when a client is viewing a property and sends a message to their agent, the subject line automatically fills with the street address of the property being viewed.

Consistent with the invention, the agent or his buyers or sellers are provided with a Message Center when they log in. The Message Center is their personal post office. When the Message Center is opened, the messages received are displayed in a date sequence, with the last message received shown first. Messages from an agent's clients are received and messages to the clients are stored indefinitely, unless they are deleted or the client is removed from the system. The user can by clicking view either messages received or messages sent. Messages received are preferably displayed in date sequence, with the last message received shown first. New messages also are preferably displayed in bold type, to further simplify there identification. The system preferably includes a New Message Indicator, such as a closed envelope, to visually alert the user of messages he has not seen. Messages are viewed by clicking on their subject link.

The Message Center may identify old messages (e.g. by an opened envelop) and new messages separately. Old messages can be viewed again by clicking on the subject link. The Message Center may have a date column for each message, indicating the date and time messages were sent. Messages sent by an agent to a client also have a status line that shows whether and when a client opened and read a message, thereby providing valuable information to the agent. The Message Center may also include a filter menu that will allow the agent to select whose messages he wants to review. This allows the agent to view messages sent and received from a particular client. The filter can also be used to view only new messages that the agent has not yet opened.

Embodiments consistent with the invention may allow the agent and his clients to enter and share with each other tasks to be completed, and due dates for such tasks. This is shown on web pages as a To Do List, in one embodiment. The agent or client can enter in the description box a brief description of the task, to be identified in a list to the other, and additional details can be entered in the details box. A due date menu allows the user to select when a task is due, by either selecting options (such as today, tomorrow, etc.) or enter the specific due date and time. When a project is completed, the user can "close" the task. If a task is not closed by its due date, the agent and/or client will receive a reminder notice. The user can select either open or closed tasks, and embodiments consistent with the invention may include filters that allow the user to switch, for example, between all tasks, current tasks, and past due tasks. In such embodiments, the tasks may be arranged in date sequence, with past due tasks shown first. Task with due dates approaching, can also be highlighted, and the agent or his client can also edit the tasks, or change the due date. The system also includes a reopen feature that will allow the agent or client to reopen tasks that were thought to be completed and therefore were closed, but were later found to require additional work. Closed tasks are preferably saved for a preselected period of time, e.g. 30 days, so allow the agent of client to review the tasks and check when they were completed.

Systems and methods consistent with the invention are incorporated into a Server system in which agents, buyers, and sellers can access the system through the Internet. In one embodiment, when the agent logs into the system, he is provided with a LbAgent page. From that page he can select a variety of options that might include, for example, Frontpage, Buyer Services, Seller Services (also at times referenced in this application as CMA page), Message Center, To Do List, and Help. The agent's web page may allow the agent to send or review messages from any of these options. The agent's web page also displays the agent's account information, including the last login by the agent. The agent has an inbox that identifies messages received, as well as projects approaching a due date. Also in the embodiment, a flashing envelope may be displayed in a prominent place on the web page, to identify to the agent any unopened new messages from his clients. The agent can then open the message, even if he has not activated the Message Center. Sellers and buyers of the agent are provided similar webpages and options, as disclosed in this application. The agent can decide what options his clients (sellers or buyers) or other persons that he grants access (customers) can use, when they log into the system. By means of example, the agent can activate or not allow his clients to tag properties or to perform their own searches. The system may also provide more information to actual clients (having a contract with the agent) than a customer or potential client. For example, a customer might be restricted from viewing information such as days on the market, price history, property notes, tax value or rate, and area sales.

Applicants include the following summary of an embodiment consistent with the present invention to further explain and describe the associated methods and system.

As explained above and below, embodiments consistent with the present invention may provide a system and method that enables real estate agents to create interactive, multi-dimensional, property information web sites for themselves and their respective buyers and sellers. The web sites are automatically updated and maintained and deliver a unique array of property information and messaging services that link buyers and sellers to their agents. The disclosed methods and systems of the invention thereby increase the effectiveness and efficiency of agents and their clients who have access to the system. Moreover, the users can access the system through the internet from any location where a user has a computer with internet communication capabilities.

Methods and systems consistent with the present invention may allow the process server of the system to be periodically updated, preferably several times a day. In that operation, the system connects periodically to a Master Property Database (such as Multiple Listing Service) to retrieve property information that was added or changed in the outside database. The retrieved information is processed and integrated internally into the For-sale Database and the Sold Databases of the system. The For-sale and Sold Databases are included in the Property Data 24 shown in FIG. 1 and are available for searching by the system, as it operates. The agent and his clients (buyers and sellers) can initiate searches through the databases, and the databases at times automatically are searched by the system, as the system updates information or responds to logins or requests from a user.

The disclosed system creates a number of internal databases that are generated, updated, and accessed during its application and use. In one embodiment, these internal databases include, for example, a For-Sale Database of properties for-sale, a Sold Database of Properties sold, an Agent Database of agents and their profiles, a Sellers Database of sellers and their profiles, a Buyers Database of buyers and their profiles, a Message Database of messages to and from an agent, and a To Do Database of calendared projects created by agents and their clients.

Consistent with the invention, an agent can provide access to all of his or her active buyers or sellers. The agent grants access to an agent's client by placing profile information regarding the client into the system, to set up an account for the client. The profile information included for a particular client can include the client's name and address, phone number, and email address. The information can further include a seller's property, the type of property a buyer's is looking for, the geographical areas of interest, the price range, and other feature criteria, including "like to have," and "must have" features. The agent can either allow, or not allow, a given client access to account features, such as a Buyer's Report (the report of properties falling within the criteria), or a Property Lookup feature (allowing a client to perform his or her own searches), or the appointments feature. In one embodiment, the disclosed systems and methods may in turn notify the buyers and sellers that their accounts have been created and give them their respective logins and passwords. The system creates data for each individual buyer and seller. The agent and his client (buyer or seller) can access the information on these databases, at their respective individual convenience. Moreover, both the agent and client can review the databases and information at the same time and activate various system features, while they both are viewing the resultant webpages.

When an agent logs into the system, the system in a preferred embodiment queries the Agent Database to determine the agent's last login, the Message Database to identify new messages to the agent, the appointments database to check for appointments, and the To Do Database to check for any items requiring action. The agent can activate any of these features to view specific reports. For example, if the agent wants to review buyer information, he selects Buyer Services from the menu bar. In a preferred embodiment, the system then provides the agent with the option of viewing a variety of reports, such as a Buyer's Report, or a Viewed List, or a Tagged List, or a Buyer Profile.

If the agent activates Buyer's List, the system reviews the Buyer Database and provides the agent with a listing of each buyer, the buyer's last login, and the last time the agent viewed the Buyer's Report or the Buyer's Viewed List, or the Buyer's Tagged List. The Buyer's List for each buyer gives the agent the number (and earliest date) for any updates since the last time the agent viewed the information, any new views by the buyer, or any new tags by the buyer. It also provides the last login for the buyer. In a preferred embodiment, the system automatically queries the For-sale Database and identifies to the agent the number of properties that both match a given buyer's criteria and were added or changed since the agent last viewed the Buyer's Report. The system, after querying the User Database, preferably identifies to the agent the number and identity of properties viewed by the buyer since the agent last looked at the buyer's Viewed List. The system similarly identifies the count and identity of properties tagged by the buyer since the agent last viewed the buyer's Tagged List. The system also indicates who (the agent or the buyer) tagged the properties, If an agent activates New Activities for a given buyer, the system will provide a report that highlights and places at the top of the list all of the New Updates (newly added properties or changes in property information previously on the list) so that the agent can immediately be aware of these changes. The system may mark these highlighted properties as either new or changed, to assist the user in his review.

If an agent activates the New Views for a given buyer, the system will identify to the agent any properties that the buyer has viewed and place those properties at the top of the list and highlighted. Similarly, if the agents activates the New Tags for a given buyer, the system will identify and place at the top of the list and highlight properties that the buyer has tagged. The Last Login feature will advise the agent of the last time the buyer used the system. The system also allows the buyer to request that his existing search criteria be changed by the agent, and this request is sent to the agent. All of this information will educate the agent about his buyer and allow the agent to better serve the buyer and find a property that the buyer will purchase.

As shown in FIG. 3, the information provided in a Buyer's Report can include, for example, a property's address, subdivision, levels, bedrooms, baths, age, square footage, and price. The report preferably indicates whether the properties are actively on the market, or are pending a sale, or have been sold. As shown in FIG. 4, a user can request and review a list of only those properties, and their features, that have been tagged.

As shown in FIG. 6, a user can also view a given property and thereby receive a photograph of the property. In a preferred embodiment, additional information regarding the property is included with the view. Such information can include the area, the multiple listing number, the age, levels, square footage, price, bedrooms, heat, type, style, exterior, acreage, $/sq. ft., baths, water, parking, and any other information in the databases.

In one embodiment, actions taken by the agent and the buyer are recorded, for future use. When an agent, buyer, or seller logs into the system, the date of the login is recorded. When a buyer views a given property, that choice is monitored and recorded. In addition, a user can tag a property that he likes, by clicking on the Tag It link associated with a property. The system checks the Userstate Database and updates it to indicate who (agent or buyer) tagged a property, and when. If a viewed property was not previously in the Buyer Report list, a new record is created with the buyer's identification, the property multiple listing number, and a time stamp. When the property listing is tagged, different tag markers are used, one to indicate that the agent tagged the property and another to indicate the buyer tagged the property. If the buyer tags the property, the system preferably sends a message to the agent, indicating that the buyer tagged a property. Similarly, if the agent tags the property, the system preferably sends a message to the buyer, providing notice. Both the buyer and agent can untag a property.

Under the systems and methods of the invention, the agent can provide his buyers or sellers with comparables for a property, either through reports provided by the agent to his client buyers or sellers, or through search features that the buyer and seller can use to perform their own searches, or both. The agent or his clients can obtain comparables of "for-sale" or "sold" properties through an automatic search feature, where the search is performed in response to criteria entered by the agent, seller or buyer, in response to selections provided on the user's web pages. The user selects criteria to be used in the search, and the server then searches though the property database to provide the results. The "for-sale" comparable feature in response provides the user with a dynamic listing of comparable "for-sale" properties, from which the user can review or view detailed information by clicking properties of interest. The "sold" comparable feature provides a similar dynamic listing of "sold" comparables. The agent, buyer, or seller also can perform Property Lookup searches, as explained previously, to find additional properties that might be a good comparables.

The agent, buyer, or seller can select, from the properties found through one or all three of these searches, the specific property comparables that he wants to use as a comparable listing to assist him in the real estate process. The agent, seller, or buyer can then use a Cyber CMA feature to take the selected comparable properties to create a report that identifies not only the "for-sale" and "sold" comparables and their characteristics, but also relevant financial information to provide averages and even a proposed selling price, or selling price range, or offering price, or offering price range. Thus, the user, can use the resultant information to assist him in selecting a potential offering price by the buyer or listing price for the seller.

Figure 21:
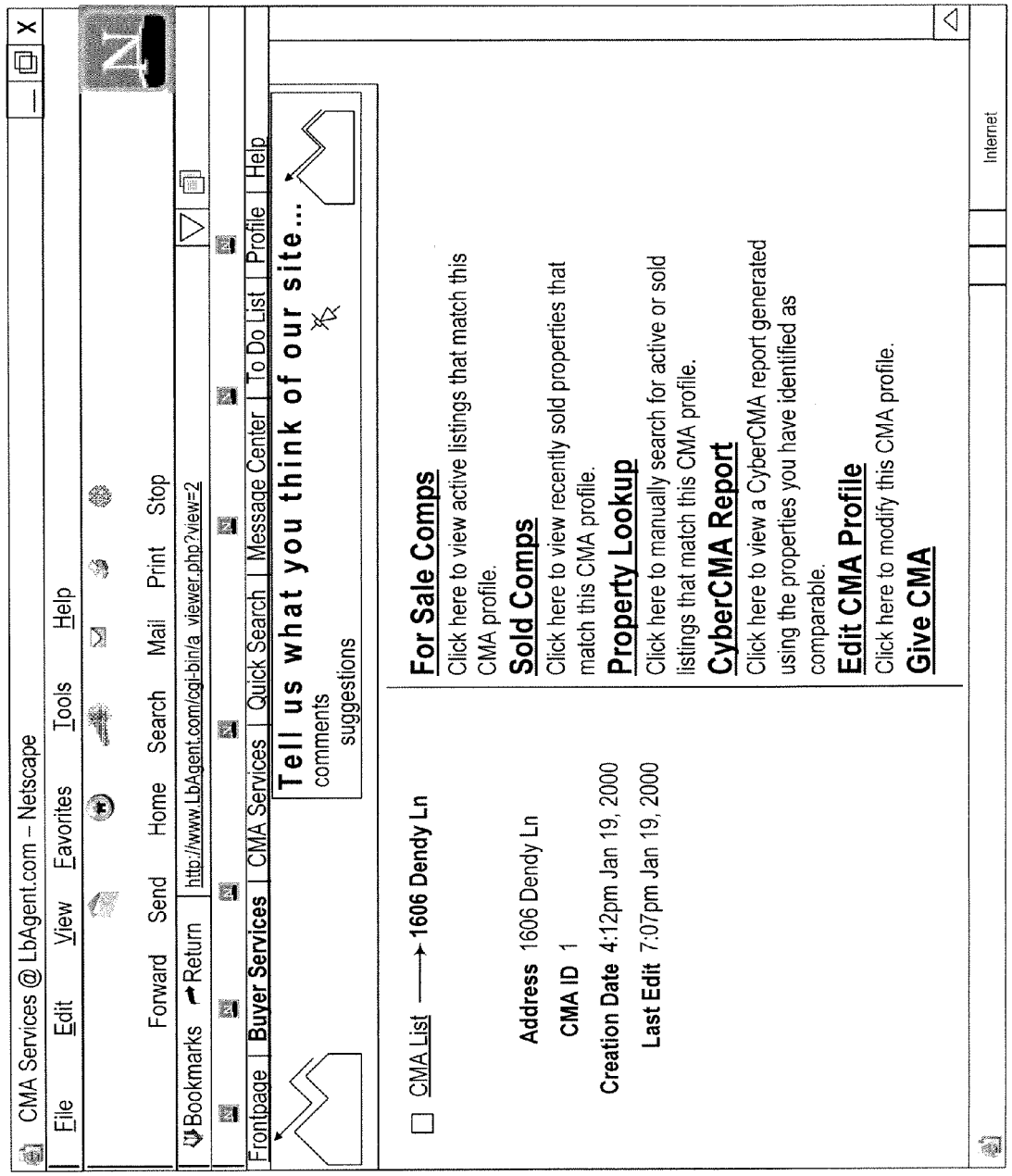
FIG. 21 illustrates an example of a CMA Services agent page, consistent with an embodiment of the present invention.
Figure 22:
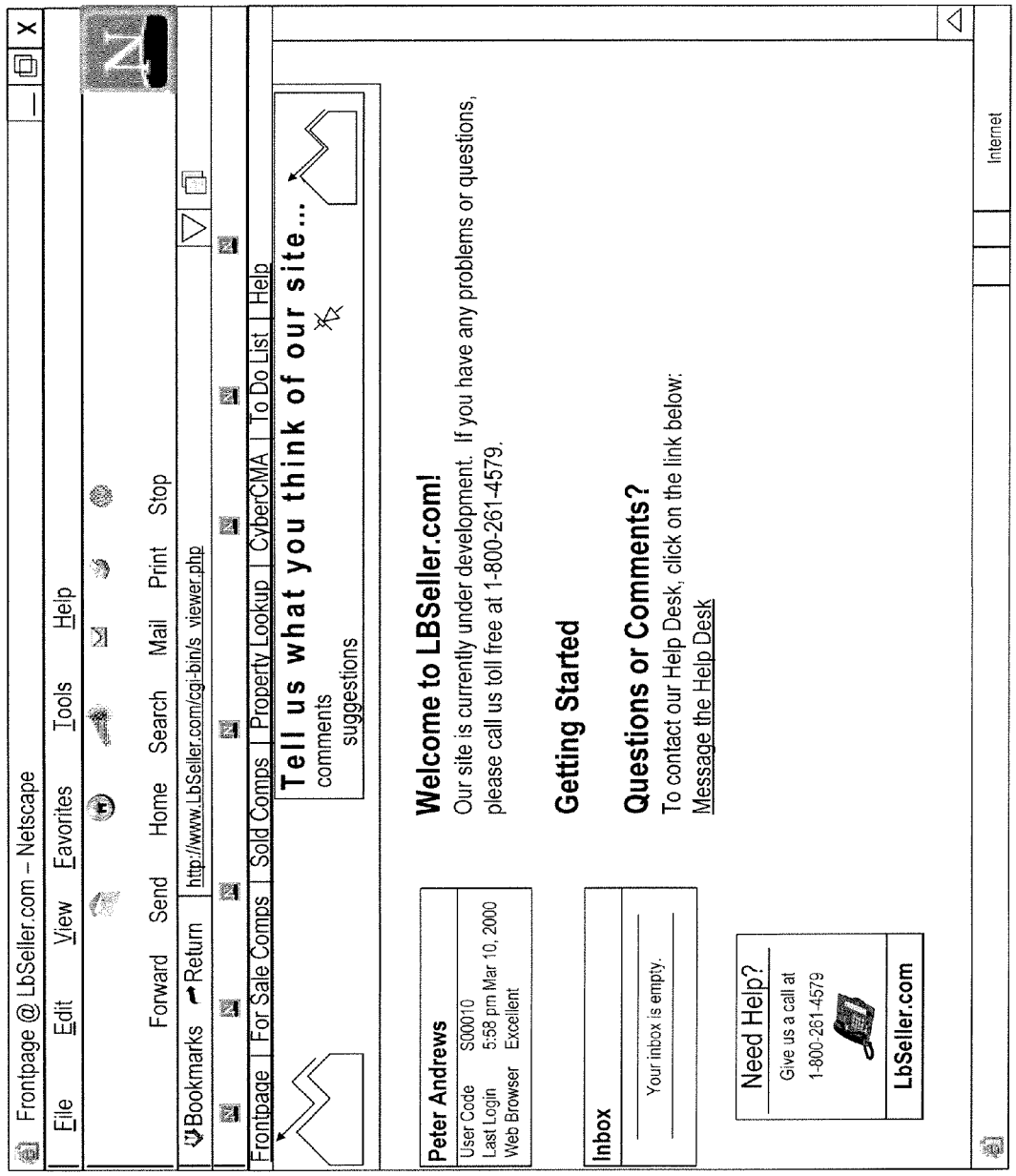
FIG. 22 illustrates an example of a seller front page, consistent with an embodiment of the present invention.

FIG. 21, by way of example, illustrates a web page of an agent showing comparable features available to the agent. As shown, the agent by going to a specific property on his CMA list can activate For-sale Comps, Sold Comps, Property Lookup, Cyber CMA Report, Edit CMA report, or Give CMA. FIG. 22 illustrates a front page of a seller and show that the seller similar can activate For-sale Comps, Sold Comps, Property Lookup, and Cyber CMA. The buyer has front page with similar features.

To obtain a "for-sale" or "sold" comparable, the user fills out a form and identifies a property by its multiple listing number, or by its address. Through the form, the user can select criteria for the search and thereby limit the search to properties listed or sold within a specified period of time (e.g. within 6 months or a year) or within specific geographical areas or within certain price ranges. The user can further limit the search to properties of a certain size or having certain features. Once the form is completed, the profile is assigned an ID number and added to the CMA Database. The system then queries the For-sale Database to obtain a "for-sale" listing of comparables or the Sold Database to find a list of "sold" comparable properties. The Query Rules applied by a preferred embodiment of the present invention are shown in FIG. 24, by way of example.

The search results are provided to the user, preferable in a dynamic listing that provides a general overview in the list or table. The system in a table can for each property provide valuable information such as the properties' identification, location, levels, number of bedrooms, number of baths, age, sq. footage, listing price, sales price and so forth. The user can click on individual properties on the list to view the properties and learn even more about the specific characteristics of properties of particular interest.

Methods and systems consistent with the present invention may provide the agent with a comparative market analysis list of each property for which he has performed a search to find comparables for that property. The list, for example, would include the identification of the property, and preferably its owner, a CMA identification number, and a New Activities and New Sales feature. The system preferably indicates the last time the agent viewed the respective properties' "for-sale" and "sold" comparables. The system, when activated by the agent to pull up the comparative market analysis for a property on the list, preferably will automatically query the "for-sale" and "sold" databases to find properties that match the criteria used to provide the previous comparables, to thereby identify to the agent additions or changes, and the oldest dates of such additions or changes, again similar to the buyer list. The new or changed properties are highlighted on the resulting updated list. By clicking the New Activities feature, the agent can quickly learn or any new additions or changes to "for-sale" properties. By clicking on the New Sales feature, the agent can quickly learn of new sales or pending sales.

In one embodiment, a comparable report provided by the invention, called Cyber CMA Report, is available to both the client and the agent through the invention. The agent or his client first selects properties from his previous searches to be included in the Cyber CMA Report. When the Cyber CMA Report feature is activated, the system then obtains information regarding these selected properties from the property databases, analyzes the information, and prepares a report that identifies the properties and provides statistics and/or graphs. In a preferred embodiment, the Cyber CMA Report lists several For-sale comparables and provides along with the specifics for each comparable, the average list price, average $/sq. ft., days on the market, and average market time for those properties. It does the same for a separate list of Sold Comparables. An example of such a CyberCMA Report is shown in FIG. 23. As shown, that report also provides the user with "low price," "average price," and "high price" ranges, based on the properties selected for inclusion in the Cyber CMA Report.

In one embodiment, the agent's seller is also provided with a Sold Comps feature. The seller can select Sold Comps from the menu bar, and a list of properties comparable to the seller's property is returned. The invention provides this list by retrieving the seller criteria entered by the agent and querying the sold property database available to the server. The invention preferably arranges the properties in the order of comparability to the seller's property. Recent sales not previously viewed are highlighted.

The system also provides the agent with a record of every message sent to or received from his clients. The system tracks when messages were sent and received, and records when they are read. Once an agent logs in, he can activate the Message Center. The system queries the Message Database for a list of messages received by the agent and queries the User Database for the names of the buyers and sellers that sent the agent messages. The messages are then reported by buyers and sellers. The agent can also request to see the message that he sent, or that he hasn't opened. The agent can request only previously viewed messages, or messages received from a particular buyer or seller.

Methods and systems consistent with the present invention preferably may provide an inbox for the agents, sellers, and buyers. For example, the inbox of the agent preferably notifies the agent of messages from his client, properties a client tagged and items in his To Do List. In boxes for the seller and buyer provide similar notices and information.

One feature of the disclosed embodiments is that the system is available not only to the agent, but also to his clients. A buyer or seller accesses the system by entering his user code. The system is activated and a front-page is then sent back.

The Buyer's front page, for example, informs the buyer of any criteria change to the buyer criteria entered by the agent, any New Messages, any Tagged Properties, and any To Do items. In one embodiment, the buyer is provided with his last login date, the last time the agent changed any criteria, new messages from the agent, new tags of properties by the agent, and any items requiring the buyer's attention.

The buyer can review the list of properties matching the criteria entered by the agent by selecting Buyer Report from the menu bar. The system then retrieves the buyer's criteria from the Buyer Database and queries the For-sale Database to provide an updated listing of properties matching the buyer's criteria. The properties are arranged in an updated order with the most recent properties on top. New and changed properties not previously viewed by the buyer are marked by highlighting. If, for example, the price or description of a property changes, the "changed" property will be placed at the top of the list and highlighted. In one embodiment, Properties matching the buyer's Must Have and Like to Have features (entered by the agent) will have a Smile Face or similar designation added to the beginning of their address, indicating a "perfect" match. The properties on the list are also checked against the list of tagged properties stored in the buyer's profile, and a Tag Marker is added to the display line.

After viewing the properties on the Buyer Report, the buyer can clear markers, so that when he requests an updated Buyer Report at a later time, only the most recently changed, new, or tagged properties will be marked. As shown in FIG. 6a, the buyer in a preferred embodiment of the invention can request a Photo Report, Area Report, or Loan Report for each property on the list.

In addition to reviewing Buyer Report properties selected according to the criteria placed into the system by his agent, a buyer can use the system to perform a Property Lookup search. The buyer selects the Property Lookup from their menu bar and then fills out his desired search criteria on a form. For example, the buyer can input selected criteria, such as target price, price range, sub-division, street name, or MLS number. The system then queries the Buyer Database for the buyer's MLS area and also can query the For-sale Database, to locate properties that match the criteria entered by the buyer. The search results are provided to the buyer in a form like that of the Buyer Property List, and the buyer can view, tag, and study properties in the same manner as properties on the Buyer Property List. The buyer can tag any properties of interests, and the agent will be automatically notified that the buyer tagged a property.

As a buyer considers properties, he can obtain additional information about a property. For example, a buyer can request a Price History Report. The system queries the For-sale Database and provides the buyer with for the property's address, current price, last price change date, previous price, and initial listing price. The buyer can also learn how many days a property has been on the market. The buyer can also request an Area Sales Report, and the system searches the Sold Database for properties sold in the same area during a selected time frame, such as six months, a year, or two years, and so forth. The buyer can also obtain a Loan Report. The Loan Report, for example, accepts the listed price and provides loan information. For example, the Loan Report can provide the user with the loan information based on a 5%, 10%, and 20% down payment. The report can also provide tax and insurance costs. The buyer can also activate a To Do List function and review or enter projects (and relevant dates) that need to be completed during the home buying process.

Embodiments consistent with the invention may allow the agent and his client to share information. For example, as the buyer uses the system and reviews property and information, the buyers can review the buyer criteria placed into the system by the agent, including the "Like to Have" and the "Must Have" features and request that the agent make changes. A message is sent to the agent, who in a preferred embodiment is the only person authorized to make the changes. Through this system, the buyer can reassess what is important to him, and the agent will become aware of the buyer's current thinking and requirements.

As shown in FIG. 11, the system can provide an agent with a Seller List that can identify all of the seller properties, along with any appointments, any seller accounts associated with the property, and the last login.

When a seller logs into the system, the system queries the Seller Database to determine the seller's menu bar format and last login. The Message Database and the To Do Database are checked for any items requiring attention, and the resulting information is received by the seller. If the seller wishes to review Comparisons, she can select For-sale Comparisons or Sold Comparisons and receive reports. Any new or changed properties not previously viewed by the seller are highlighted. The seller, like a buyer, can also select Property Lookup, fill out search criteria, and receive and review For-sale or Sold properties matching her criteria.

The Seller can also select Cyber CMA from the menu bar and receive the Cyber CMA report from the CMA Database. The seller can view detailed reports on each comparable, including, for example, a photograph of the property, its address, the geographical area, the age, exterior, levels, square footage, price, bedrooms, heat, basement, MLS#, style, acreage, $/sq. ft., baths, water, parking, and so forth. In addition, when the seller reviews the results of a Property Lookup search, she can add properties she selects into her Cyber CMA Report, as well as remove properties from the report.

The CMA and Buyer Report service of the disclosed embodiments may allow agents to authorize and review the information the sellers or buyers receive and work with his clients efficiently. An agent can send and receive information that his clients can review at any time and place. The agent can make online presentations to buyers or sellers. For example, if the client is not satisfied with the report CMA property list they receive, they can review the For-sale Comps and Sold Comps online with the agent and add or remove CMA properties until they are satisfied with the reports. If the agent is reviewing the CMA with clients, they can tour the report properties and discuss why each property was selected for the report. The agent and buyer can similarly review Buyer Reports together, review relevant information, revise the buyer's search criteria, perform new searches, and review the newly acquired information.

The system facilitates virtual tours of properties regardless of where the viewers and agents are located. For example, an agent in city A and a wife in city B and her husband in city C can all view the same list of properties at the same time. If the agent does a conference call, he can take the couple on a virtual tour by directing the couple to properties to view. In the preferred embodiment, the system allows multiple users to view a property list at the same time. Each user is given control of the viewing process, but viewing can be coordinated since the list on their respective computers will have identical property information and are arranged in the same order.

Various embodiments of the invention have been described in fulfillment of the various objects of the invention. It should be recognized that these embodiments are merely illustrative of the principles of the present invention. Numerous modifications and adaptations thereof will be apparent to those skilled in the art without departing from the spirit and scope of the present invention.

That which is claimed is:

1. A computer-implemented method of providing client-accessed real estate information to a real estate professional associated with a first client and a second client, and for providing professional-accessed real estate information to the first client and the second client, the method comprising:
   connecting to a database of real estate information;
   providing the professional with access to the real estate information;
   storing a first account for the first client and a second account for the second client, the first account and the second account being authorized by the professional;
   providing the first client with access to the first account and providing the second client with access to the second account;
   providing the first client, when accessing the first account, with access to the real estate information;
   providing the second client, when accessing the second account, with access to the real estate information;
   monitoring actions of the professional while the professional is accessing the real estate information;
   monitoring actions of the first client while the first client is accessing the first account;
   monitoring actions of the second client while the second client is accessing the second account;
   generating and storing professional-accessed real estate information for the first client and the second client in response to the actions of the professional as the professional reviews the real estate information;
   generating and storing first client-accessed real estate information in response to the actions of the first client;
   generating and storing second client-accessed real estate information in response to the actions of the second client;
   providing at least some of the first client-accessed real estate information and at least some of the second client-accessed real estate information to the professional, thereby providing the professional with knowledge of the actions of the first client and the actions of the second client; and
   providing at least some of the professional-accessed real estate information for the first client to the first client and at least some of the professional-accessed real estate information for the second client to the second client, thereby providing the first client and the second client with knowledge of the actions of the real estate professional,
   wherein the professional-accessed real estate information for the first client includes information related to at least one for-sale property from the database of real estate information.

2. The method of claim 1 further comprising:
   receiving information identifying a property of interest;
   retrieving real estate information from the database for properties comparable to the identified property; and
   providing information about the properties comparable to the identified property.

3. The method of claim 2, wherein the professional provides the information identifying the property of interest.

4. The method of claim 2, wherein the first client provides the information identifying the property of interest, and the information about the comparable properties is provided to the first client.

5. The method of claim 4, wherein the first client is a seller, and further comprising:
   accessing the database to determine if pre-defined events have occurred for the comparable properties since the seller last viewed the comparable properties; and
   providing updated information to the seller about the comparable properties for which a pre-defined event has occurred.

6. The method according to claim 5, wherein the pre-defined events include at least one of a sale or a change in price.

7. The method according to claim 1, further comprising:
   receiving information from the first client identifying a property;
   retrieving real estate information from the database for properties comparable to the identified property;
   generating a value assessment for the identified property based on the comparable properties; and
   providing the first client with the value assessment.

8. The method of claim 1 wherein the actions of the professional include entering a message for transmission to the first client, and wherein the professional-accessed real estate information reviewable by the first client includes the message.

9. The method of claim 8, wherein the message is integrated into the first account so that when the first client is accessing the account, the first client is provided with a page reflecting the presence of the message entered by the professional.

10. The method of claim 8, further comprising storing messages between the first client and the professional.

11. The method of claim 1, further comprising providing the professional with a summary of appointments that have been carried out for a property.

12. The method of claim 11, further comprising providing the professional with comments related to one or more of the appointments, the comments being provided by a showing agent.

13. A computer executable program stored on a non-transitory computer-readable medium which, when executed on a processor, perform a computer-implemented method of providing client-accessed real estate information to a real estate professional associated with a first client and a second client, and for providing professional-accessed real estate information to the first client and the second client, the method comprising:
   connecting to a database of real estate information;
   providing the professional with access to the real estate information;
   storing a first account for the first client and a second account for the second client, the first account and the second account being authorized by the professional;
   providing the first client with access to the first account and providing the second client with access to the second account;
   providing the first client, when accessing the first account, with access to the real estate information;
   providing the second client, when accessing the second account, with access to the real estate information;
   monitoring actions of the professional while the professional is accessing the real estate information;
   monitoring actions of the first client while the first client is accessing the first account;
   monitoring actions of the second client while the second client is accessing the second account;
   generating and storing professional-accessed real estate information for the first client and the second client in response to the actions of the professional as the professional reviews the real estate information;
   generating and storing first client-accessed real estate information in response to the actions of the first client;
   generating and storing second client-accessed real estate information in response to the actions of the second client;
   providing at least some of the first client-accessed real estate information and at least some of the second client-accessed real estate information to the professional, thereby providing the professional with knowledge of the actions of the first client and the actions of the second client; and
   providing at least some of the professional-accessed real estate information for the first client to the first client and at least some of the professional-accessed real estate information for the second client to the second client, thereby providing the first client and the second client with knowledge of the actions of the real estate professional,
   wherein the professional-accessed real estate information for the first client includes information related to at least one for-sale property from the database of real estate information.

14. The computer-readable medium of claim 13, the method further comprising:
   receiving information identifying a property of interest;
   retrieving real estate information from the database for properties comparable to the identified property; and
   providing information about the properties comparable to the identified property.

15. The computer-readable medium of claim 14, wherein the professional provides the information identifying the property of interest.

16. The computer-readable medium of claim 14, wherein the first client provides the information identifying the property of interest, and the information about the comparable properties is provided to the first client.

17. The computer-readable medium of claim 16, wherein the first client is a seller, and the method further comprising:
   accessing the database to determine if pre-defined events have occurred for the comparable properties since the seller last viewed the comparable properties; and
   providing updated information to the seller about the comparable properties for which a pre-defined event has occurred.

18. The computer-readable medium according to claim 17, wherein the pre-defined events include at least one of a sale or a change in price.

19. The computer-readable medium according to claim 13, the method further comprising:
   receiving information from the first client identifying a property;
   retrieving real estate information from the database for properties comparable to the identified property;
   generating a value assessment for the identified property based on the comparable properties; and
   providing the first client with the value assessment.

20. The computer-readable medium of claim 13 wherein the actions of the professional include entering a message for transmission to the first client, and wherein the professional-accessed real estate information reviewable by the first client includes the message.

21. The computer-readable medium of claim 20, wherein the message is integrated into the first account so that when the first client is accessing the account, the first client is provided with a page reflecting the presence of the message entered by the professional.

22. The computer-readable medium of claim 20, the method further comprising storing messages between the first client and the professional.

23. The computer-readable medium of claim 13, wherein the monitored actions of the first client include tagging of selected properties and wherein the first client-accessed real estate information provided to the professional includes for each tagging, an identification of properties tagged.

24. The computer-readable medium of claim 13, wherein the monitored actions of the professional include tagging properties for the first client to thereby identify particular tagged properties to the first client and wherein the professional-accessed real estate information for the first client includes the identification of properties tagged by the professional.

25. The computer-readable medium of claim 13, wherein the monitored actions of the first client include viewing of properties, and wherein the first client-accessed real estate information provided to the professional includes identification of properties viewed by the first client.

26. The computer-readable medium of claim 13 wherein the first client is a buyer and the second client is a buyer or a seller, the method further comprising generating a buyer list of potential properties and property characteristics in response to a request by the professional and wherein the professional-accessed real estate information reviewable by the buyer includes the buyer list.

27. The computer-readable medium of claim 26, the method further comprising automatically updating the buyer list by comparing buyer criteria for the buyer with the properties in the database of real estate information, in response to an action of the professional or the buyer.

28. The computer-readable medium of claim 13, the method further comprising enabling the first client to initiate an independent search of the real estate information according to criteria selected by the first client and review results of the independent search.

29. The computer-readable medium of claim 28, the method further comprising monitoring the first client's actions to initiate and review an independent search and storing at least portions of the results of the independent search as the first client-accessed real estate information for the first client.

30. The computer-readable medium of claim 13, the method further comprising providing the professional with a summary of appointments that have been carried out for a property.

31. The computer-readable medium of claim 30, the method further comprising providing the professional with comments related to one or more of the appointments, the comments being provided by a showing agent.

32. The computer-readable medium of claim 13, the method further comprising generating an area sales report identifying sales in an area associated with a specific property and enabling the professional and the first client to review the area sales report.

33. A system for providing client-accessed real estate information to a real estate professional associated with a first client and a second client, and for providing professional-accessed real estate information to the first client and the second client, the system comprising:
a server;
a communications circuit for connecting the server to the internet;
a component for connecting to a database of real estate information;
a component for providing the professional with access to the real estate information;
a component for storing a first account for the first client and a second account for the second client, the first account and the second account being authorized by the professional;
a component for providing the first client with access to the first account and providing the second client with access to the second account;
a component for providing the first client, when accessing the first account, with access to the real estate information;
a component for providing the second client, when accessing the second account, with access to the real estate information;
a component for monitoring actions of the professional while the professional is accessing the real estate information;
a component for monitoring actions of the first client while the first client is accessing the first account;
a component for monitoring actions of the second client while the second client is accessing the second account;
a component for generating and storing professional-accessed real estate information for the first client and the second client in response to the actions of the professional as the professional reviews the real estate information;
a component for generating and storing first client-accessed real estate information in response to the actions of the first client;
a component for generating and storing second client-accessed real estate information in response to the actions of the second client;
a component for providing at least some of the first client-accessed real estate information and at least some of the second client-accessed real estate information to the professional, thereby providing the professional with knowledge of the actions of the first client and the actions of the second client; and
a component for providing at least some of the professional-accessed real estate information for the first client to the first client and at least some of the professional-accessed real estate information for the second client to the second client, thereby providing the first client and the second client with knowledge of the actions of the real estate professional,
wherein the professional-accessed real estate information for the first client includes information related to at least one for-sale property from the database of real estate information.

34. The system of claim 33, further comprising:
a component for receiving information identifying a property of interest;
a component for retrieving real estate information from the database for properties comparable to the identified property; and
a component for providing information about the properties comparable to the identified property.

35. The system of claim 34, further comprising a component for receiving, from the professional, the information identifying the property of interest.

36. The system of claim 34, further comprising:
a component for receiving, from the first client, the information identifying the property of interest; and
a component for providing, to the first client, the information about the comparable properties.

37. The system of claim 36, wherein the first client is a seller, and further comprising:
a component for accessing the database to determine if pre-defined events have occurred for the comparable properties since the seller last viewed the comparable properties; and
a component for providing updated information to the seller about the comparable properties for which a pre-defined event has occurred.

38. The system according to claim 37, wherein the pre-defined events include at least one of a sale or a change in price.

39. The system according to claim 33, further comprising:
a component for receiving information from the first client identifying a property;
a component for retrieving real estate information from the database for properties comparable to the identified property;

a component for generating a value assessment for the identified property based on the comparable properties; and a component for providing the first client with the value assessment.

40. The system of claim 33 wherein the actions of the professional include entering a message for transmission to the first client, and wherein the professional-accessed real estate information reviewable by the first client includes the message.

41. The system of claim 40, wherein the message is integrated into the first account, and further comprising:

a component for providing the first client with a page reflecting the presence of the message entered by the professional.

42. The system of claim 40, further comprising a component for storing messages between the first client and the professional.

43. The system of claim 33, wherein the monitored actions of the first client include tagging of selected properties and wherein the first client-accessed real estate information provided to the professional includes for each tagging, an identification of properties tagged.

44. The system of claim 33, wherein the monitored actions of the professional include tagging properties for the first client to thereby identify particular tagged properties to the first client and wherein the professional-accessed real estate information for the first client includes the identification of properties tagged by the professional.

45. The system of claim 33, wherein the monitored actions of the first client include viewing of properties, and wherein the first client-accessed real estate information provided to the professional includes identification of properties viewed by the first client.

46. The system of claim 33 wherein the first client is a buyer and the second client is a buyer or a seller, the system further comprising a component for generating a buyer list of potential properties and property characteristics in response to a request by the professional and wherein the professional-accessed real estate information reviewable by the buyer includes the buyer list.

47. The system of claim 46, further comprising a component for automatically updating the buyer list by comparing buyer criteria for the buyer with the properties in the database of real estate information, in response to an action of the professional or the buyer.

48. The system of claim 33, further comprising a component for enabling the first client to initiate an independent search of the real estate information according to criteria selected by the first client and review results of the independent search.

49. The system of claim 48, further comprising a component for monitoring the first client's actions to initiate and review an independent search and storing at least portions of the results of the independent search as the first client-accessed real estate information for the first client.

50. The system of claim 33, further comprising a component for providing the professional with a summary of appointments that have been carried out for a property.

51. The system of claim 50, further comprising a component for providing the professional with comments related to one or more of the appointments, the comments being provided by a showing agent.

52. The system of claim 33, further comprising a component for generating an area sales report identifying sales in an area associated with a specific property and enabling the professional and the first client to review the area sales report.

* * * * *